(12) United States Patent
Takagi et al.

(10) Patent No.: US 8,661,180 B2
(45) Date of Patent: Feb. 25, 2014

(54) MEMORY CONTROLLING DEVICE AND MEMORY CONTROLLING METHOD

(75) Inventors: Satoshi Takagi, Tokyo (JP); Yasuhiro Matsui, Chiba (JP); Masao Tanaka, Kanagawa (JP); Takahiro Ikarashi, Tokyo (JP); Akihiko Saotome, Tokyo (JP); Hiroshi Sumihiro, Kanagawa (JP); Yukinao Kenjo, Tokyo (JP)

(73) Assignee: Sony Corporation, Tokyo (JP)

( * ) Notice: Subject to any disclaimer, the term of this patent is extended or adjusted under 35 U.S.C. 154(b) by 978 days.

(21) Appl. No.: 12/766,194

(22) Filed: Apr. 23, 2010

(65) Prior Publication Data

US 2010/0281232 A1 Nov. 4, 2010

(30) Foreign Application Priority Data

May 1, 2009 (JP) ................................ P2009-111828

(51) Int. Cl.
*G06F 12/06* (2006.01)
*G06F 12/00* (2006.01)
*G06F 13/00* (2006.01)
*G06F 13/28* (2006.01)
*G11C 8/00* (2006.01)

(52) U.S. Cl.
USPC ........... 711/5; 711/104; 711/105; 365/230.03

(58) Field of Classification Search
None
See application file for complete search history.

(56) References Cited

U.S. PATENT DOCUMENTS

| 6,393,512 | B1 * | 5/2002 | Chen et al. ........................ 711/5 |
| 6,457,114 | B1 * | 9/2002 | Paluch ........................ 711/219 |
| 7,346,750 | B2 * | 3/2008 | Ishikawa ........................ 711/157 |
| 2004/0073767 | A1 * | 4/2004 | Johnson et al. ............... 711/202 |
| 2004/0093457 | A1 * | 5/2004 | Heap ................................ 711/5 |
| 2008/0104340 | A1 * | 5/2008 | Shih ............................... 711/154 |
| 2008/0320268 | A1 * | 12/2008 | Wingard et al. ............. 711/202 |
| 2009/0204771 | A1 * | 8/2009 | Kawamoto et al. ........... 711/151 |
| 2010/0057952 | A1 * | 3/2010 | Miwa ............................. 710/35 |

FOREIGN PATENT DOCUMENTS

JP 2003 186740 7/2003

* cited by examiner

*Primary Examiner* — Yaima Rigol
(74) *Attorney, Agent, or Firm* — Frommer Lawrence & Haug LLP; William S. Frommer

(57) ABSTRACT

Disclosed herein is a memory controlling device including: an address converting section configured to convert a logical address included in a request issued from a plurality of clients into a physical address of a memory; a request dividing section configured to divide a converted request converted by the address converting section by a command unit for the memory on a basis of the physical address of the converted request; and an arbitrating section configured to perform arbitration on a basis of the physical address indicated in a divided request output from the request dividing section.

10 Claims, 20 Drawing Sheets

MEMORY CONTROLLING DEVICE AND MEMORY CONTROLLING METHOD

BACKGROUND OF THE INVENTION

1. Field of the Invention

The present invention relates to a memory controlling device, and particularly to a memory controlling device controlling access to a memory having a plurality of banks and a processing method thereof.

2. Description of the Related Art

Heretofore, a synchronous DRAM (SDRAM: Synchronous Dynamic Random Access Memory), which is advantageous in terms of price, bus band, and capacity, is widely used as a memory system. This SDRAM is a DRAM operating in synchronism with a clock signal, and is formed by a plurality of banks in many cases.

When different rows in an identical bank are consecutively accessed in the SDRAM of such a configuration, efficiency of data transfer in the SDRAM is decreased significantly. On the other hand, a large number of methods for suppressing the decrease in the efficiency of data transfer have been devised. For example, a method has been proposed which makes two buffers retain respective access requests to access a memory and which outputs an access request selected from the retained access requests and indicating a bank address different from a bank address accessed at a previous time (see Japanese Patent Laid-Open No. 2003-186740 (FIG. 1), for example).

SUMMARY OF THE INVENTION

The above-described technique in related art can reduce consecutive access to different rows in an identical bank by providing two buffers and comparing access requests retained in the respective buffers with each other. In this case, however, because address converting means converts the logical addresses of the access requests into physical addresses of the SDRAM after arbitration, a circuit for changing the order of the access requests needs to be provided in addition to arbitration means. Thus, the order of access requests is controlled twice in a memory controlling device, so that the order of access requests cannot be controlled efficiently.

The present invention has been made in view of such a situation. It is desirable to improve data transfer efficiency in a memory system.

According to a first embodiment of the present invention, there are provided a memory controlling device and a processing method of the memory controlling device. The memory controlling device includes: an address converting section configured to convert a logical address included in a request issued from a plurality of clients into a physical address of a memory; a request dividing section configured to divide the converted request converted by the address converting section by a command unit for the memory on a basis of the physical address of the converted request; and an arbitrating section configured to perform arbitration on a basis of the physical address indicated in the divided request output from the request dividing section. Thereby an effect is produced in that arbitration is performed by the arbitrating section on a basis of the physical addresses of the memory which physical addresses are indicated in the divided requests.

In addition, in the first embodiment, when a converted request converted by the address converting section specifies access to a plurality of rows in an identical bank of the memory, the request dividing section may divide the converted request by a row unit of the identical bank, and when the arbitrating section receives a plurality of divided requests from the request dividing section corresponding to the plurality of clients, the arbitrating section may output one of the divided requests other than a divided request indicating an identical bank address to a bank address of an output request output immediately before and indicating a row address different from a row address of the output request. Thereby, an effect is produced in that a converted request requesting access to a plurality of rows in an identical bank of the memory is divided by a row unit of the identical bank, and when a plurality of divided requests each output from the request dividing section corresponding to each of the plurality of clients are received, the arbitrating section suppresses consecutive output of divided requests specifying different row addresses of an identical bank. In this case, the address converting section may output a converted request indicating a start address represented by a physical address and a transfer length as length of data to be accessed in the memory to the request dividing section. The request dividing section may include a start address outputting block configured to output one of the start address of the converted request and a next start address obtained by adding the start address of the converted request to a cumulative total value of division length for dividing the converted request as a start address of a divided request. The request dividing section may also include a division length generating block configured to generate the division length from a start column address included in the start address of the divided request, the start address of the divided request being output from the start address outputting block, to a termination column address of a row indicated in the start address of the divided request. The request dividing section may further include a transfer length outputting block configured to output a smaller one of the division length generated by the division length generating block and a differential transfer length obtained by subtracting a cumulative total value of the division length from the transfer length of the converted request as a transfer length of the divided request. Thereby, an effect is produced in that the start address of a divided request which start address is generated on the basis of the start address of a converted request and a division length for dividing the converted request is output by the start address outputting block, and together with this, the transfer length of the divided request which transfer length is generated on the basis of the division length from a start column address included in the start address of the divided request to a termination column address thereof and the transfer length of the converted request is output by the transfer length outputting block.

In addition, in the first embodiment, the request dividing section may divide the converted request by a burst length unit of the memory on a basis of the physical address of the converted request converted by the address converting section. Thereby, an effect is produced in that the converted request is divided by the request dividing section by a burst length unit of the memory on a basis of the physical address of the converted request converted by the address converting section.

In addition, in the first embodiment, when a plurality of first converted requests specifying one address are sequentially output from the address converting section, the request dividing section may generate a second converted request indicating a start address represented by the physical address and a transfer length as length of data to be accessed in the memory on a basis of the plurality of first converted requests, and divide the generated second converted request by a row unit in the memory. Thereby, an effect is produced in that a second converted request indicating a start address represented by the physical address and a transfer length is generated by the request dividing section on the basis of a plurality of first converted requests continuously output from the address converting section, and the generated second converted request is divided by a row unit in the memory.

In addition, in the first embodiment, the memory controlling device may further include a continuous outputting section configured to retain divided requests sequentially output from the request dividing section, and on a basis of a plurality of the retained divided requests, continuously output the plurality of divided requests. Thereby, an effect is produced in that divided requests sequentially output from the request dividing section are sequentially retained by the continuous outputting section, and when a predetermined condition is exceeded, a plurality of the retained divided requests are output continuously by the continuous outputting section. In this case, the continuous outputting section may output the plurality of divided requests continuously on a basis of a predetermined threshold value related to a number of the plurality of divided requests. Thereby, an effect is produced in that when a predetermined threshold value related to the number of a plurality of divided requests is exceeded, the plurality of divided requests are output continuously by the continuous outputting section.

Further, in the case where the memory controlling device further includes a continuous outputting section configured to retain divided requests sequentially output from the request dividing section, and on a basis of a plurality of the retained divided requests, continuously output the plurality of divided requests, the continuous outputting section may continuously output the plurality of divided requests on a basis of a predetermined threshold value related to a cumulative total of transfer lengths indicated in the plurality of divided requests. Thereby, an effect is produced in that when a predetermined threshold value related to a cumulative total of transfer lengths indicated in the plurality of divided requests is exceeded, the plurality of divided requests are output continuously by the continuous outputting section.

According to the present invention, it is possible to produce an excellent effect of being able to improve data transfer efficiency in a memory system.

DETAILED DESCRIPTION OF PREFERRED EMBODIMENTS

Modes for carrying out the present invention (hereinafter referred to as embodiments) will hereinafter be described. Description will be made in the following order.

1. First Embodiment (Request Dividing Method: Example of Dividing Requests Specifying Start Address and Transfer length)

2. Second Embodiment (Request Dividing Method: Example of Dividing Requests Specifying One Address)

3. Third Embodiment (Adapter Additional Function: Example of Adding Additional Function to Adapter)

1. First Embodiment

Example of Configuration of Memory Controlling Device

Figure 1:
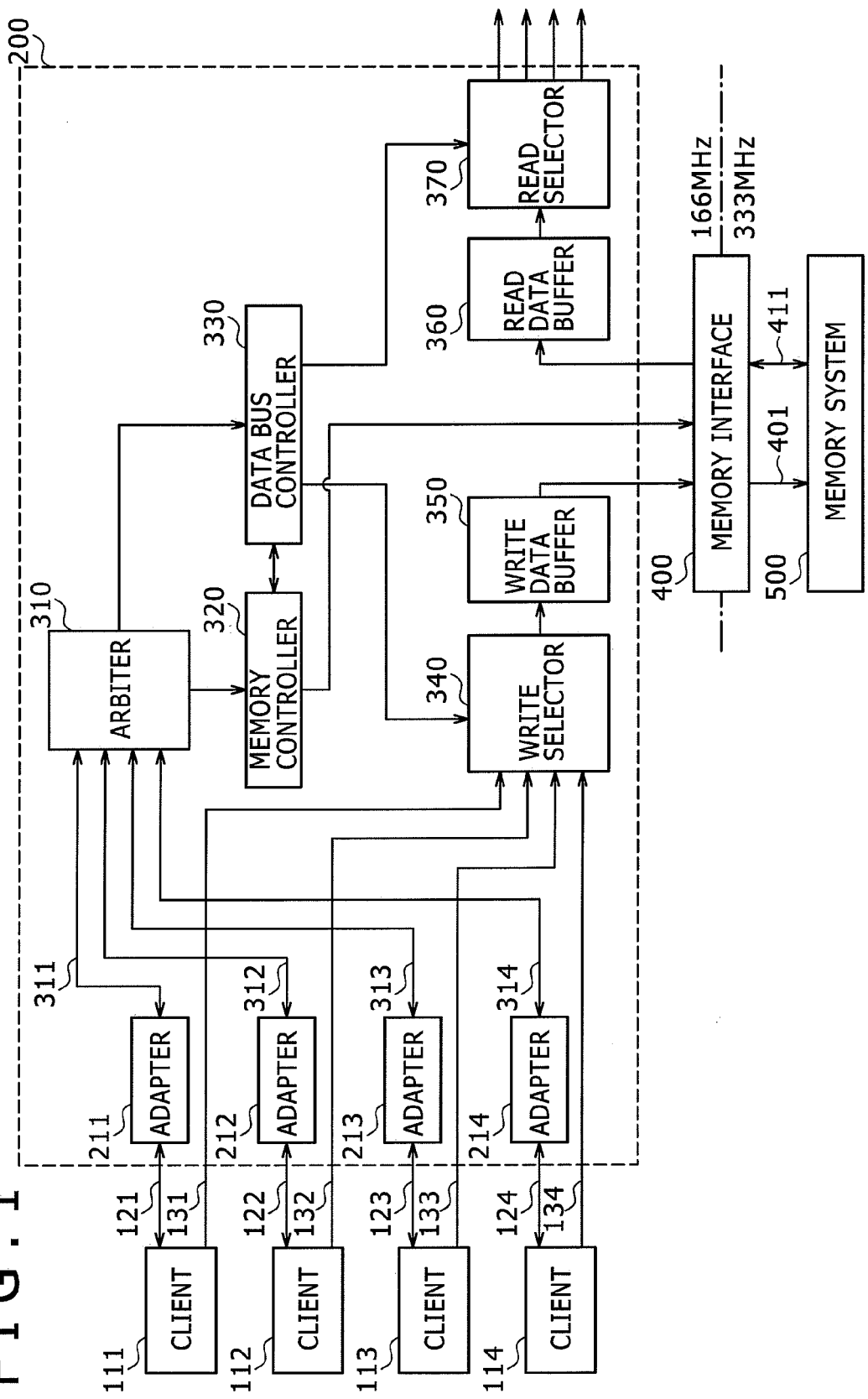
FIG. 1 is a block diagram showing an example of configuration of a memory controlling device according to a first embodiment of the present invention.

FIG. 1 is a block diagram showing an example of configuration of a memory controlling device according to a first embodiment of the present invention. FIG. 1 illustrates a basic configuration of an integrated circuit including clients 111 to 114, a memory controlling device 200, a memory interface 400, and a memory system 500. In the following, for convenience, only a case where the clients 111 to 114 write data to the memory system 500 will be assumed.

The memory controlling device 200 forming this integrated circuit includes adapters 211 to 214, an arbiter 310, a memory controller 320, and a data bus controller 330. The memory controlling device 200 further includes a write selector 340, a write data buffer 350, a read data buffer 360, and a read selector 370.

The clients 111 to 114 each write data to the memory system 500. The clients 111 to 114 are for example a central processing unit (CPU), a functional block or the like. The clients 111 to 114 write data to the memory system 500 via the memory controlling device 200 and the memory interface 400.

In this example, the clients 111 to 114 issue a request to write to the memory system 500 to the memory controlling device 200 via respective request lines 121 to 124. This request for example includes a logical address in a virtual storage area given to each of the clients 111 to 114, transfer length, which is the length of data to be accessed, client identifying information for identifying the client, and a transfer direction. The transfer direction in this case indicates whether the request is a writing request to write data or a reading request to read data. Incidentally, in this case, requests issued from the clients 111 to 114 specify a writing request as the transfer direction.

In addition, the clients 111 to 114 output writing data to be written to the memory system 500 to the write selector 340 via data lines 131 to 134 according to a data output instruction from the adapters 211 to 214. Incidentally, the clients 111 to 114 are an example of a plurality of clients described in claims.

The memory controlling device 200 is a memory bus system controlling the writing of data to the memory system 500 and the reading of data stored in the memory system 500 on the basis of requests issued from the clients 111 to 114. Incidentally, the memory controlling device 200 is an example of a memory controlling device described in claims.

The adapters 211 to 214 divide requests from the clients 111 to 114 by a command unit issued to the memory system 500. Specifically, the adapter 211 divides a request issued from the client 111 by the command unit. The adapter 212 divides a request issued from the client 112 by the command unit. The adapter 213 divides a request issued from the client 113 by the command unit. The adapter 214 divides a request issued from the client 114 by the command unit.

In addition, to divide requests issued from the clients 111 to 114 by the command unit, the adapters 211 to 214 convert logical addresses included in the requests into physical addresses corresponding to the memory system 500. The physical addresses in this case indicate a bank, a row, and a column forming the memory system 500, and refer to a bank address, a row address, and a column address. By thus being converted from the logical addresses to the physical addresses, the converted requests indicate a bank address, a row address, and a column address in the memory system 500. In addition, the adapters 211 to 214 output the divided requests to the arbiter 310 via divided request lines 311 to 314, respectively.

In addition, when receiving a request to issue a request from the clients 111 to 114, the adapters 211 to 214 output an enabling signal enabling the issuance of the request to the clients 111 to 114 via the request lines 121 to 124. In addition, the adapters 211 to 214 instruct the clients 111 to 114 to output writing data on the basis of a result of arbitration (access permission) for a divided request from the arbiter 310. Incidentally, while the above description is made of an example in which an instruction to output writing data is given from the adapters 211 to 214 to the clients 111 to 114, the present invention is not limited to this. For example, the adapters 211 to 214 may retain writing data from the clients 111 to 114, and output data corresponding to a result of arbitration from the arbiter 310, which data is included in the retained writing data, to the write selector 340.

The arbiter 310 is an arbitrating section for performing arbitration on the basis of physical addresses indicated in divided requests output from the adapters 211 to 214. When receiving a plurality of divided requests from the adapters 211 to 214 at the same time, for example, the arbiter 310 suppresses output of a divided request indicating an identical bank address to that of an output request output immediately before and indicating a different row address from that of the output request. That is, when receiving a plurality of divided requests, the arbiter 310 selects one of the divided requests other than a divided request indicating an identical bank address to that of an output request and indicating a different row address from that of the output request.

In addition, the arbiter 310 outputs the selected divided request to the memory controller 320, and supplies client identifying information and transfer information included in the selected divided request to the data bus controller 330. In addition, the arbiter 310 instructs the adapter 211 to 214 corresponding to the client 111 to 114 identified by the client identifying information included in the selected divided request to output writing data corresponding to the divided request. Incidentally, the arbiter 310 is an example of an arbitrating section described in claims.

The memory controller 320 outputs a command to the memory system 500 via the memory interface 400 on the basis of a divided request output from the arbiter 310. The memory controller 320 for example issues a command by a bank interleaving method for making parallel access to a plurality of banks in the memory system 500.

The data bus controller 330 controls the write selector 340 or the read selector 370 to establish a connection between a client selected by the arbiter 310 and the write data buffer 350 or the read data buffer 360. The data bus controller 330 controls the write selector 340 and the read selector 370 on the basis of client information and transfer information supplied from the arbiter 310.

In this example, the data bus controller 330 controls the write selector 340 so as to output writing data from the clients 111 to 114 to the write data buffer 350. That is, the data bus controller 330 changes the connection of the write selector 340 so as to enable data transfer between the client 111 to 114 indicated by the client information and the write data buffer 350. On the other hand, when a divided request representing a readout request is output from the arbiter 310, the data bus controller 330 controls the read selector 370 so as to output data retained in the read data buffer 360 to a client that issued the readout request.

The write selector 340 is a selector for establishing a connection between one of the clients 111 to 114 and the write data buffer 350 under control of the data bus controller 330. The read selector 370 is a selector for establishing a connection between one of the clients 111 to 114 and the read data buffer 360 under control of the data bus controller 330.

The write data buffer 350 is a buffer for absorbing an effect of a delay in transfer of writing data supplied from the clients 111 to 114. The write data buffer 350 temporarily retains data supplied from the write selector 340 in correspondence with one divided request. The write data buffer 350 supplies the retained data to the memory interface 400.

The read data buffer 360 is a buffer for absorbing an effect of a delay in transfer of data supplied from the memory interface 400. The read data buffer 360 temporarily retains data supplied from the memory interface 400 in correspondence with one divided request. The read data buffer 360 supplies the retained data to the read selector 370.

The memory interface 400 establishes a connection between the memory controlling device 200 and the memory system 500. The memory interface 400 outputs a command supplied in synchronism with an operating clock of the memory controlling device 200 and writing data from the write data buffer 350 on the basis of a memory clock of the memory system 500. In addition, the memory interface 400 outputs data read in synchronism with the memory clock in the memory system 500 to the read data buffer 360 in synchronism with the operating clock of the memory controlling device 200. The memory interface 400 for example establishes a connection between the memory controlling device 200 operating on the operating clock of 166 MHz and the memory system 500 operating on the memory clock of 333 MHz.

In addition, the memory interface 400 outputs data output from the write data buffer 350 with a data width of the memory controlling device 200 to the memory system 500 with a data width of the memory system 500. On the other hand, the memory interface 400 outputs data read with the data width of the memory system 500 to the read data buffer 360 with the data width of the memory controlling device 200. The memory interface 400 for example establishes a connection between the memory controlling device 200 having a data width of 64 bits and the memory system 500 having a data width of 32 bits.

In addition, the memory interface 400 outputs a command issued from the memory controller 320 to the memory system 500 via a command line 401. In addition, the memory interface 400 outputs writing data output from the write data buffer 350 to the memory system 500 via a data line 411. In addition, the memory interface 400 outputs readout data read out from the memory system 500 to the read data buffer 360 via the data line 411.

The memory system 500 stores data from the clients 111 to 114. The memory system 500 is realized by an SDRAM, and is formed by X (X is an integer of two or more) banks. Each of the banks is formed by Y (Y is an integer of two or more) rows, and each of the rows is formed by Z (Z is an integer of two or more) columns. That is, each of the X banks is formed by Y×Z storage elements arranged in the form of a two-dimensional matrix. The memory system 500 is for example a DDR2_SDRAM (Double Data Rate 2 SDRAM) or a DDR3_SDRAM for an ordinary personal computer.

The memory system 500 writes data from the clients 111 to 114 and reads data stored in each bank according to commands issued from the memory controller 320. The writing and reading of data in this case will be referred to as access. The memory system 500 continuously transfers data in certain burst length units on the basis of a column address specified by a command. The memory system 500 for example performs data transfer with four-word or eight-word data as one burst length unit.

When the memory system 500 for example receives a writing command to write data from the memory controller 320, the memory system 500 writes the data supplied from the memory controller 320. On the other hand, when receiving a reading command to read data from the memory controller 320, the memory system 500 outputs the stored data to the memory interface 400. Incidentally, the memory system 500 is an example of a memory described in claims.

By thus providing the adapters 211 to 214, the arbiter 310 can perform arbitration on the basis of the physical addresses of requests. Incidentally, while the above description has been made of an example in which the adapters 211 to 214 divide writing requests for writing from the clients 111 to 114, the adapters 211 to 214 similarly divide reading requests to read data from the memory system 500. A basic configuration of the adapters 211 to 214 will next be described in detail with reference to drawings.

Example of Configuration of Adapter 211

Figure 2:
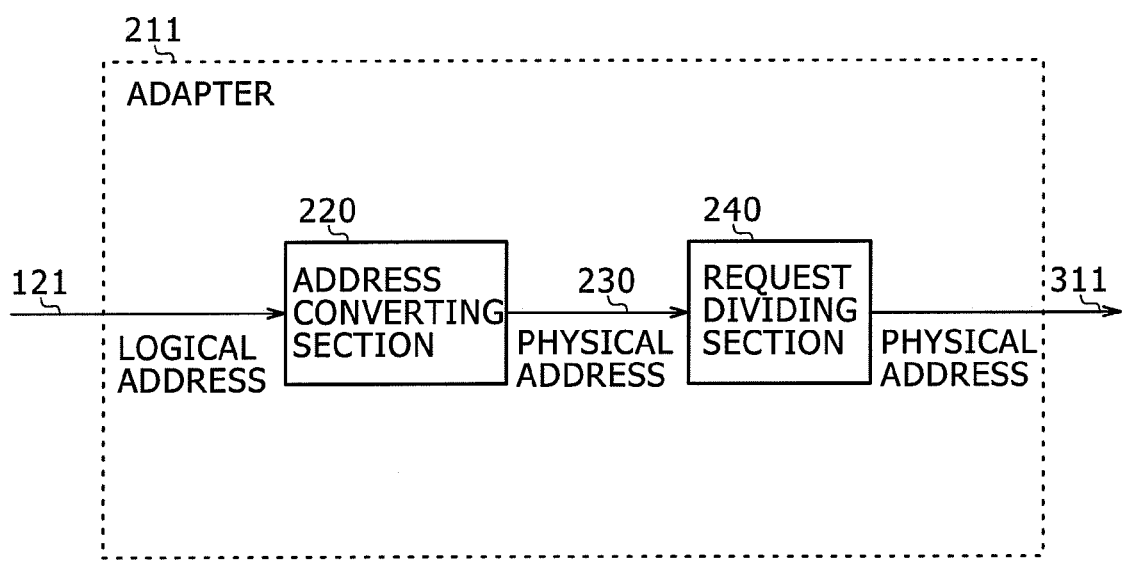
FIG. 2 is a block diagram showing an example of configuration of an adapter according to the first embodiment of the present invention.

FIG. 2 is a block diagram showing an example of configuration of the adapters 211 to 214 according to the first embodiment of the present invention. In the following, description will be made only of an example of configuration of the adapter 211 because the adapters 211 to 214 have the same configuration.

The adapter 211 includes an address converting section 220 and a request dividing section 240. The address converting section 220 converts a logical address included in a request issued from the client 111 via the request line 121 into a physical address in the memory system 500. The address converting section 220 outputs the request converted from the logical address to the physical address as a converted request to the request dividing section 240 via a converted request line 230. Incidentally, the address converting section 220 is an example of an address converting section described in claims.

The request dividing section 240 divides the converted request by the command unit for the memory system 500 on the basis of the physical address of the converted request output from the converted request line 230. Specifically, when receiving one converted request specifying access to a plurality of rows of an identical bank in the memory system 500, the request dividing section 240 divides the converted request by the row unit of the identical bank. The request dividing section 240 for example divides the converted request by a burst length unit in the memory system 500. In addition, the request dividing section 240 supplies the divided converted request as a divided request to the divided request line 311. Incidentally, the request dividing section 240 is an example of a request dividing section described in claims.

By thus converting the logical address included in a request into a physical address by the address converting section 220, the request dividing section 240 can divide the converted request by the command unit of the memory system 500. In addition, dividing the converted request by the burst length unit by the request dividing section 240 can prevent access to the memory system 500 for a long period by one of the clients 111 to 114. The address conversion of the address converting section 220 will next be briefly described in the following with reference to drawings.

Example of Physical Address Assignment by Address Converting Section 220

Figure 3A:
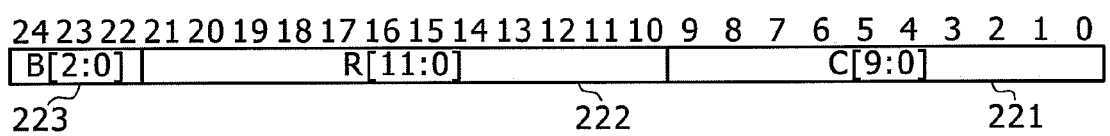
FIGS. 3A and 3B are diagrams showing an example of physical address assignment by an address converting section according to the first embodiment of the present invention.
Figure 3B:
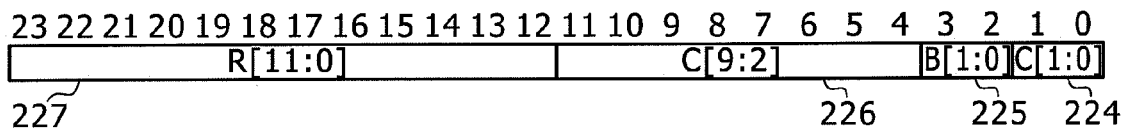

FIGS. 3A and 3B are diagrams showing an example of physical address assignment by the address converting section 220 according to the first embodiment of the present invention. FIG. 3A is a diagram showing an address conversion table for converting a logical address of a 0th to a 24th bit into a physical address corresponding to the memory system 500. FIG. 3B is a diagram showing an address conversion table for converting a logical address of a 0th to a 23rd bit into a physical address corresponding to the memory system 500.

FIG. 3A shows an address conversion table for assigning a 0th to a 9th bit to a column address (C[9:0]) 221, assigning a 10th to a 21st bit to a row address (R[11:0]) 222, and assigning a 22nd to a 24th bit to a bank address (B[2:0]) 223. On the basis of the address conversion table, the address converting section 220 converts a logical address of the 0th to 24th bits into a physical address indicating the bank address, the row address, and the column address.

FIG. 3B shows an address conversion table for assigning a 0th and a 1st bit to a column address (C[1:0]) 224, assigning a 2nd and a 3rd bit to a bank address (B[1:0]) 225, assigning a 4th to an 11th bit to a column address (C[9:2]) 226, and assigning a 12th to a 23rd bit to a row address (R[11:0]) 227. In this address conversion table, the bank address of the physical address is changed each time the logical address is advanced by four. Therefore, a bank interleave of each unit of four words for the memory system 500 can be realized by performing address conversion on the basis of the address conversion table.

Thus, the address converting section 220 can convert the logical addresses specified by requests from the clients 111 to 114 into physical addresses corresponding to the memory system 500 by using the address conversion table.

Example of Configuration of Request Dividing Section 240

Figure 4:
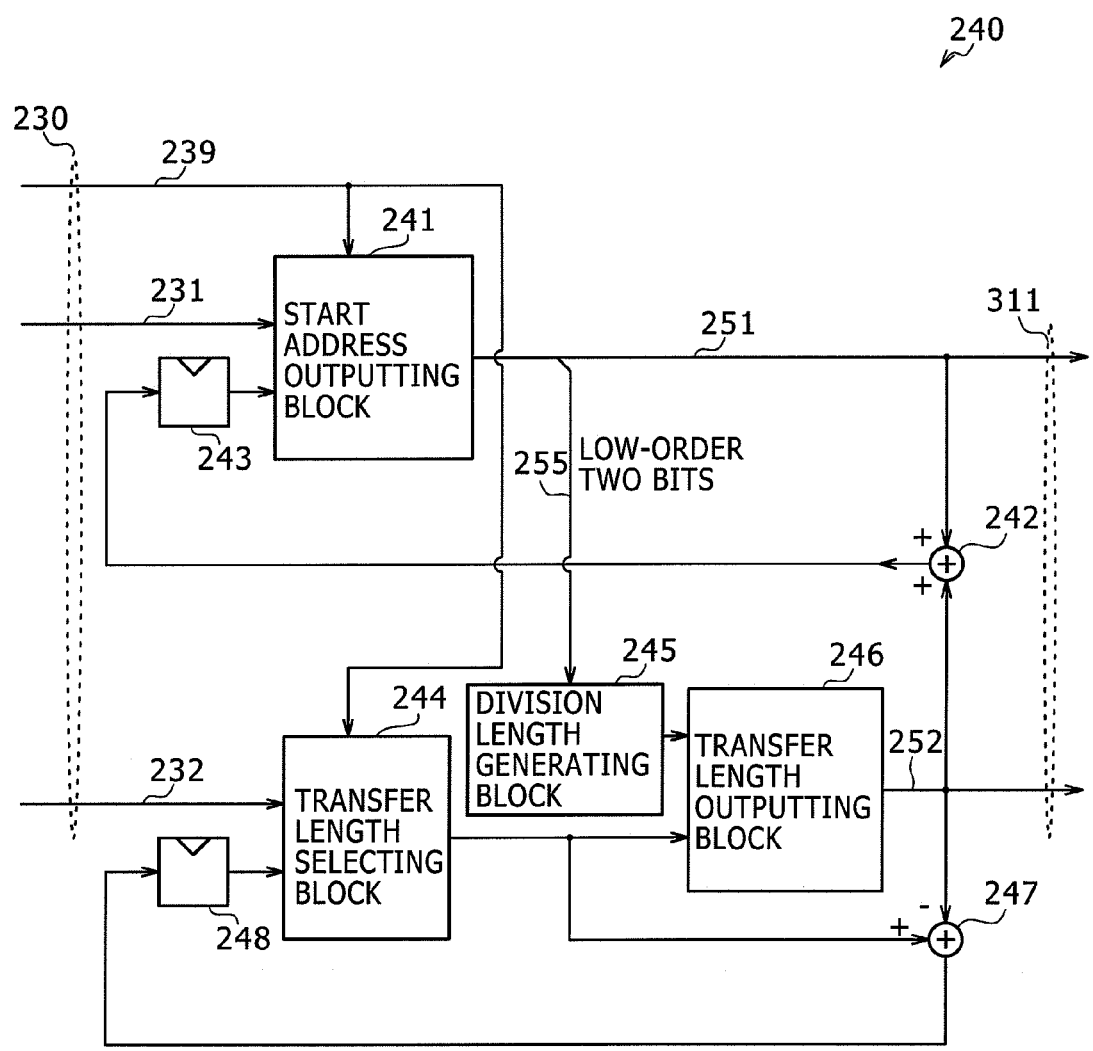
FIG. 4 is a block diagram showing an example of configuration of a request dividing section according to the first embodiment of the present invention.

FIG. 4 is a block diagram showing an example of configuration of the request dividing section 240 according to the first embodiment of the present invention. It is assumed in this case that the logical address of a request issued from the client 111 indicates a start address representing a start position of an address range to be accessed and transfer length.

In this example, the converted request line 230 for establishing connection between the address converting section 220 and the request dividing section 240 includes a start address line 231, a transfer length line 232, and an initializing signal line 239. The start address line 231 is supplied with the start address of a physical address converted by the address converting section 220. In addition, the transfer length line 232 is supplied with a transfer length included in the request issued from the client 111 via the address converting section 220. Further, the initializing signal line 239 is supplied with an initializing signal indicating timing in which the converted request is supplied.

The request dividing section 240 includes a start address outputting block 241, a next start address calculating block 242, and a next start address register 243. In addition, the request dividing section 240 includes a transfer length selecting block 244, a division length generating block 245, a transfer length outputting block 246, a differential transfer length calculating block 247, and a differential transfer length register 248.

The start address outputting block 241 is a selector for selecting one of a start address from the start address line 231 and a next start address output from the next start address register 243 on the basis of the initializing signal from the initializing signal line 239. The next start address in this case refers to a start address indicated in a divided request next to a divided request output from the start address outputting block 241 immediately before.

When the start address outputting block 241 is supplied with the initializing signal from the initializing signal line 239, the start address outputting block 241 selects the start address supplied from the start address line 231. On the other hand, when the start address outputting block 241 is not supplied with the initializing signal from the initializing signal line 239, the start address outputting block 241 selects the next start address retained in the next start address register 243. In addition, the start address outputting block 241 outputs the selected one of the start address and the next start address to the arbiter 310 and the next start address calculating block 242 via a start address line 251 included in the divided request line 311.

The start address outputting block 241 further outputs a start column address included in the selected address to the division length generating block 245 via a column address line 255 included in the start address line 251. Incidentally, the start address outputting block 241 is an example of a start address outputting block described in claims.

The next start address calculating block 242 adds together the start address output from the start address outputting block 241 and the transfer length output from the transfer length outputting block 246. That is, the next start address calculating block 242 adds the transfer length from the transfer length outputting block 246 to the start address output from the start address outputting block 241 so as to follow the order of physical addresses in the memory system 500. The next start address calculating block 242 thus calculates a next start address as the start address of a next divided request. In addition, the next start address calculating block 242 outputs the next start address calculated on the basis of the start address from the start address outputting block 241 and the transfer length from the transfer length outputting block 246 to the next start address register 243.

The next start address register 243 retains the next start address output from the next start address calculating block 242. The next start address register 243 outputs the retained next start address to the start address outputting block 241.

The transfer length selecting block 244 is a selector for selecting one of the transfer length from the transfer length line 232 and a differential transfer length output from the differential transfer length register 248 on the basis of the initializing signal from the initializing signal line 239. The differential transfer length in this case refers to a transfer length obtained by subtracting a cumulative total value of transfer lengths of divided requests output in the past in the converted request from the transfer length indicated in the converted request.

When the transfer length selecting block 244 is supplied with the initializing signal from the initializing signal line 239, the transfer length selecting block 244 selects the transfer length supplied from the transfer length line 232. On the other hand, when the transfer length selecting block 244 is not supplied with the initializing signal from the initializing signal line 239, the transfer length selecting block 244 selects the differential transfer length output from the differential transfer length register 248. In addition, the transfer length selecting block 244 outputs the selected one of the transfer length and the differential transfer length to the transfer length outputting block 246 and the differential transfer length calculating block 247.

The division length generating block 245 generates a division length for dividing the converted request on the basis of the start column address included in the start address and output from the start address outputting block 241 via the column address line 255. The division length generating block 245 for example calculates a length from the start column address included in the start address from the start address outputting block 241 to the termination column address of the row indicated in the start address as a division length. In this case, the division length generating block 245 retains the termination column address of each row in advance.

In this case, the division length generating block 245 generates a division length by the burst length unit in the memory system 500 on the basis of the start column address included in the start address from the start address outputting block 241. In this case, the division length generating block 245 for example generates a division length by the burst length unit on the basis of the low-order two bits of the start column address from the start address outputting block 241. That is, the division length generating block 245 sets a length from the start position of access in a burst unit determined by the low-order two bits of the start column address to a terminating position in the burst length unit as a division length. For example, when the value of the low-order two bits of the start column address is "3," the value of the low-order two bits of the start column address indicates the termination of the burst length unit, and therefore the division length generating block 245 sets the division length at "1."

In this example, the division length generating block 245 retains a division length correspondence table showing relation between the value of the low-order two bits of the start column address and the division length in advance. The division length correspondence table is generated on the basis of DDR standards. The division length correspondence table for example shows a division length of "4" when the value of the low-order two bits of the start column address is "0," a division length of "1" when the value of the low-order two bits of the start column address is "1," a division length of "2" when the value of the low-order two bits of the start column address is "2," and a division length of "1" when the value of the low-order two bits of the start column address is "3." Incidentally, because the unit of rows in the memory system 500 and the unit of burst length coincide with each other, the division length generating block 245 can divide a converted request by a row unit by generating a division length by the burst length unit on the basis of the division length correspondence table.

In addition, the division length generating block 245 outputs the division length generated on the basis of the start column address from the column address line 255 to the transfer length outputting block 246. Incidentally, the division length generating block 245 is an example of a division length generating block described in claims.

The transfer length outputting block 246 outputs the smaller one of the division length from the division length generating block 245 and the transfer length of the converted request from the transfer length selecting block 244 or the differential transfer length from the differential transfer length register 248 as the transfer length of a divided request. Incidentally, the transfer length outputting block 246 is an example of a transfer length outputting block described in claims.

The differential transfer length calculating block 247 performs subtraction between the transfer length or the differential transfer length output from the transfer length selecting block 244 and the transfer length output from the transfer length outputting block 246. The differential transfer length calculating block 247 subtracts the transfer length output from the transfer length outputting block 246 from the transfer length or the differential transfer length output from the transfer length selecting block 244. That is, the differential transfer length calculating block 247 calculates a differential transfer length by subtracting a cumulative total value of transfer lengths of divided requests output in the past in the converted request from the transfer length indicated in the converted request. In addition, the differential transfer length calculating block 247 supplies the calculated differential transfer length to the differential transfer length register 248.

The differential transfer length register 248 retains the differential transfer length output from the differential transfer length calculating block 247. The differential transfer length register 248 outputs the retained differential transfer length to the transfer length selecting block 244.

Thus the provision of the division length generating block 245 makes it possible to generate the division length for dividing the converted request by the row unit or the burst length unit in the memory system 500. In addition, the provision of the start address outputting block 241 makes it possible to output one of the start address of the converted request and the next start address obtained by adding the start address of the converted request to a cumulative total value of division length as the start address of a divided request.

In addition, the provision of the transfer length outputting block 246 makes it possible to output the smaller one of the division length generated in the division length generating block 245 and the differential transfer length obtained by subtracting a cumulative total value of division length from the transfer length of the converted request as the transfer length of a divided request. An example of division of a converted request by the request dividing section 240 will be described in the following with reference to drawings.

Example of Division of Converted Request by Request Dividing Section 240

Figure 5:
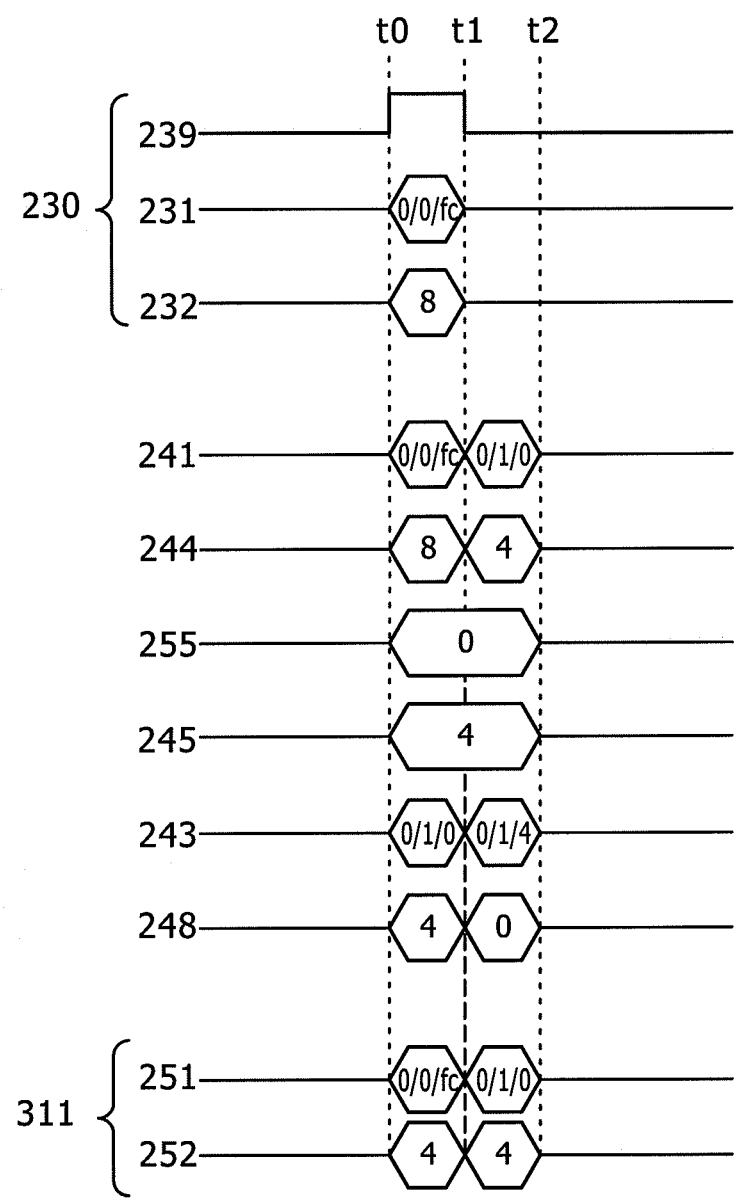
FIG. 5 is a timing chart showing an example of division of a converted request by the request dividing section according to the first embodiment of the present invention.

FIG. 5 is a timing chart showing an example of division of a converted request by the request dividing section 240 according to the first embodiment of the present invention. In this case, a converted request indicating a "0th" bank, a "0th" row, and an "fcth" column (0/0/fc) as a start address and "8" as a transfer length is assumed. In this example, a termination column address in the 0th row is an ffth column address. That is, a case of receiving a request indicating a range to be accessed in the memory system 500 which range spans the 0th and 1st rows is assumed. In addition, suppose that the division length generating block 245 generates a division length on the basis of the example of the division length correspondence table based on the DDR standards as described with reference to FIG. 4. Incidentally, a bank address (B), a row address (R), and a column address (C) will be represented as B/R/C in the following.

FIG. 5 shows the initializing signal line 239, the start address line 231, and the transfer length line 232 included in the converted request line 230. In addition, FIG. 5 shows the start address outputting block 241, the transfer length selecting block 244, the column address line 255, the division length generating block 245, the next start address register 243, and the differential transfer length register 248. Further, FIG. 5 shows the start address line 251 and a transfer length line 252 included in the divided request line 311. In addition, suppose that time passes from a left to a right (time t0 to t2).

At time t0, an initializing signal is supplied via the initializing signal line 239, and the start address "0/0/fc" and the transfer length "8" of the converted request are supplied from the start address line 231 and the transfer length line 232, respectively.

In this case, because the initializing signal is supplied to the start address outputting block 241, the start address "0/0/fc" of the converted request is output from the start address outputting block 241 to the start address line 251 of the divided request line 311. Together with this, because the initializing signal is also supplied to the transfer length selecting block 244, the transfer length selecting block 244 outputs the transfer length "8" of the converted request from the transfer length line 232.

At this time, because the low-order two bits of the start column address (fc) from the column address line 255 indicates "0," a division length "4" is output from the division length generating block 245. Then, the transfer length outputting block 246 outputs the division length "4" from the division length generating block 245, which length is the smaller value of the transfer length "8" from the transfer length line 232 and the division length "4" from the division length generating block 245, to the transfer length line 252 of the divided request line 311.

Together with this, the next start address register 243 holds a next start address "0/1/0" obtained by adding the division length "4" to the start address "0/0/fc" of the converted request in the next start address calculating block 242. In addition, the differential transfer length register 248 holds a differential transfer length "4" obtained by subtracting the output "4" of the transfer length outputting block 246 from the output "8" of the transfer length selecting block 244 in the differential transfer length calculating block 247.

At time t1, because the initializing signal is not supplied to the start address outputting block 241, the next start address "0/1/0" retained in the next start address register 243 is output to the start address line 251 of the divided request line 311. Together with this, because the initializing signal is not supplied to the transfer length selecting block 244 either, the transfer length selecting block 244 outputs the differential transfer length "4" retained in the differential transfer length register 248.

At this time, because the low-order two bits of the start column address (0) from the column address line 255 indicates "0," a division length "4" is output from the division length generating block 245. Then, because the differential transfer length "4" from the transfer length selecting block 244 and the division length "4" from the division length generating block 245 are the same, the transfer length outputting block 246 outputs "4" to the transfer length line 252 of the divided request line 311.

Together with this, the next start address register 243 holds a next start address "0/1/4" obtained by adding "4" to the start address "0/1/0" of the converted request in the next start address calculating block 242. In addition, the differential transfer length register 248 holds a differential transfer length "0" obtained by subtracting the output "4" of the transfer length outputting block 246 from the output "4" of the transfer length selecting block 244 in the differential transfer length calculating block 247.

Thus, the division length generating block 245 generates a division length by the burst unit on the basis of the start column address included in the physical address of the converted request. Thereby the converted request can be divided by the row unit in the memory system 500. An example in which a period of access to the memory system 500 is improved by dividing a converted request by the row unit on the basis of the physical address of the converted request will be described in the following with reference to drawings.

Example of Request Not Being Divided by Adapter 211

Figure 6:
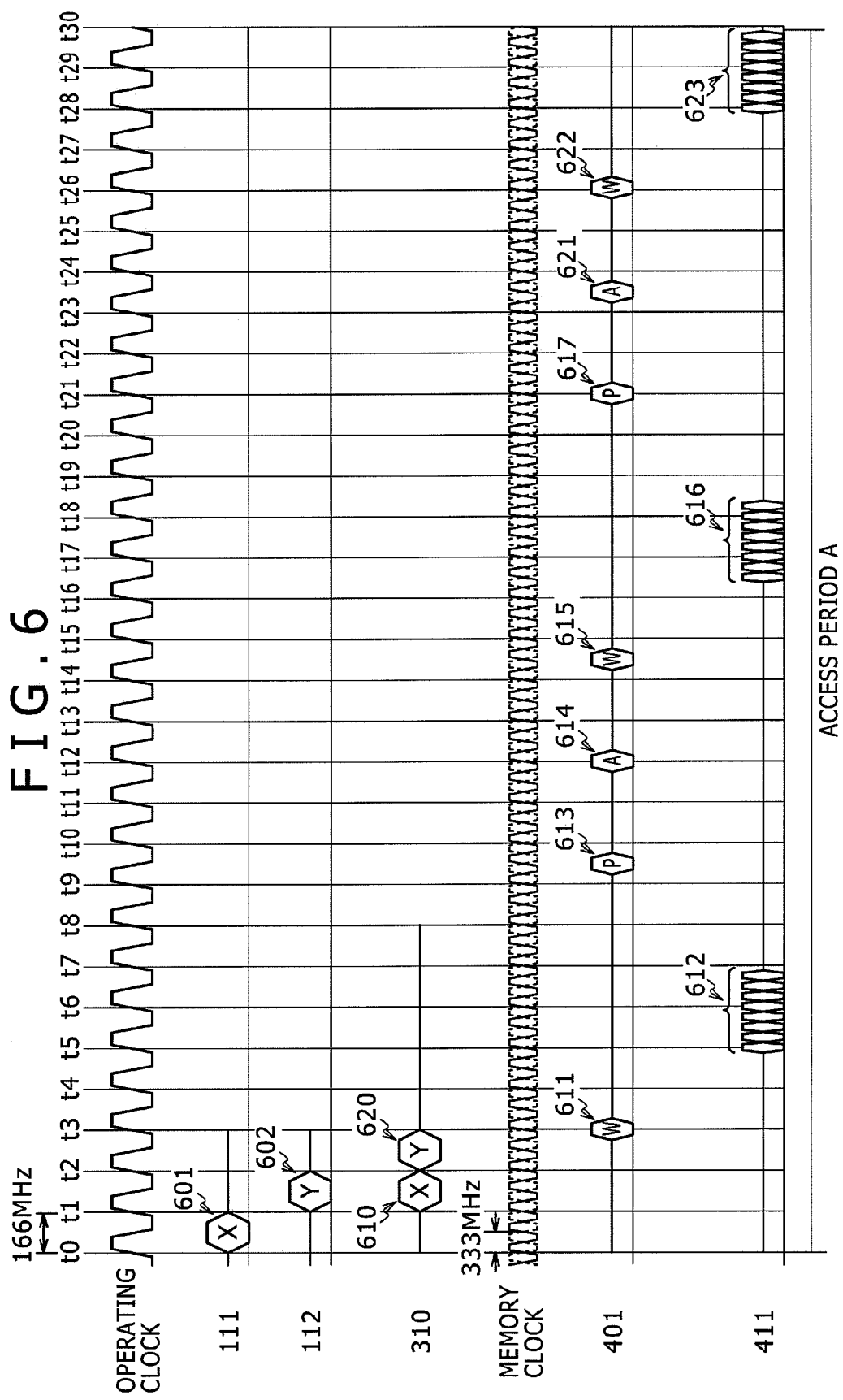
FIG. 6 is a timing chart illustrating an operation of writing to a memory system in a case where the adapter does not divide a request by the row unit of the memory system.

FIG. 6 is a timing chart illustrating an operation of writing to the memory system 500 in a case where the adapter 211 does not divide a request by the row unit of the memory system 500. FIG. 6 shows output signals of the clients 111 and 112 and the arbiter 310. FIG. 6 also shows signals supplied to the command line 401 and the data line 411.

In this example, as in FIG. 5, a request (X) 601 specifying a logical address corresponding to a start address "0/0/fc" and a transfer length "8" is issued from the client 111. It is assumed that a request (Y) 602 specifying a start address "1/0/0" different from the bank address (0) of the request (X) 601 and a transfer length "4" is then issued from the client 112.

In this example, the operating clock of the clients 111 and 112 and the memory controlling device 200 is set at 166 MHz, and the memory clock in the memory system 500 is set at 333 MHz. Thus, the clock frequency of the memory clock is twice that of the operating clock, and therefore when the transfer length of a divided request is "4," data of "8" words corresponding to twice the transfer length is continuously transferred to the memory system 500.

First, at time t0, the request (X) 601 is issued from the client 111. At time t1, the request (Y) 602 is issued from the client 112, and the arbiter 310 outputs the request (X) 610 issued from the client 111 to the memory controller 320.

Thereafter, at time t2, the arbiter 310 outputs the request (Y) 620 issued from the client 112 to the memory controller 320. Then, immediately before time t3, a writing command (W) 611 issued on the basis of the request (X) 610 and specifying the "fcth" column and the transfer length "4" is output from the memory interface 400 to the memory system 500 via the command line 401. Thereby, immediately before time t5, writing data 612 from the client 111 is transferred to the memory system 500 via the data line 411. Incidentally, it is assumed in this case that an active command specifying the "0th" bank and the "0th" row was already issued before time t0.

After time t9, a precharge command (P) 613 specifying the "0th" bank is output from the memory interface 400. Then, immediately before time t12, an active command (A) 614 issued on the basis of the request (X) 610 and specifying the "0th" bank and the "1st" row is output from the memory interface 400 via the command line 401.

Then, after time t14, a writing command (W) 615 specifying the "0th" column and the transfer length "4" is output from the memory interface 400 via the command line 401. Thereby, after time t16, writing data 616 from the client 111 is transferred to the memory system 500 via the data line 411.

Thereafter, immediately before time t21, a precharge command (P) 617 specifying the "0th" bank is output from the memory interface 400. Then, immediately after time t23, an active command (A) 621 issued on the basis of the request (Y) 620 and specifying the "1st" bank and the "0th" row is output from the memory interface 400 via the command line 401.

Then, immediately before time t26, a writing command (W) 622 specifying the "0th" column and the transfer length "4" is output from the memory interface 400 via the command line 401. Thereby, immediately before time t28, writing data 623 from the client 111 is transferred to the memory system 500 via the data line 411.

Thus, when the memory controlling device 200 in related art receives one request specifying access to a plurality of rows in an identical bank, commands to access the different rows in the identical bank are consecutively issued. Thereby, efficiency of transfer of data to the memory system 500 is decreased, and an access period A is lengthened. Next, the case of the memory controlling device 200 according to the first embodiment of the present invention will be described in the following with reference to drawings.

Example of Request Being Divided by Adapter 211

Figure 7:
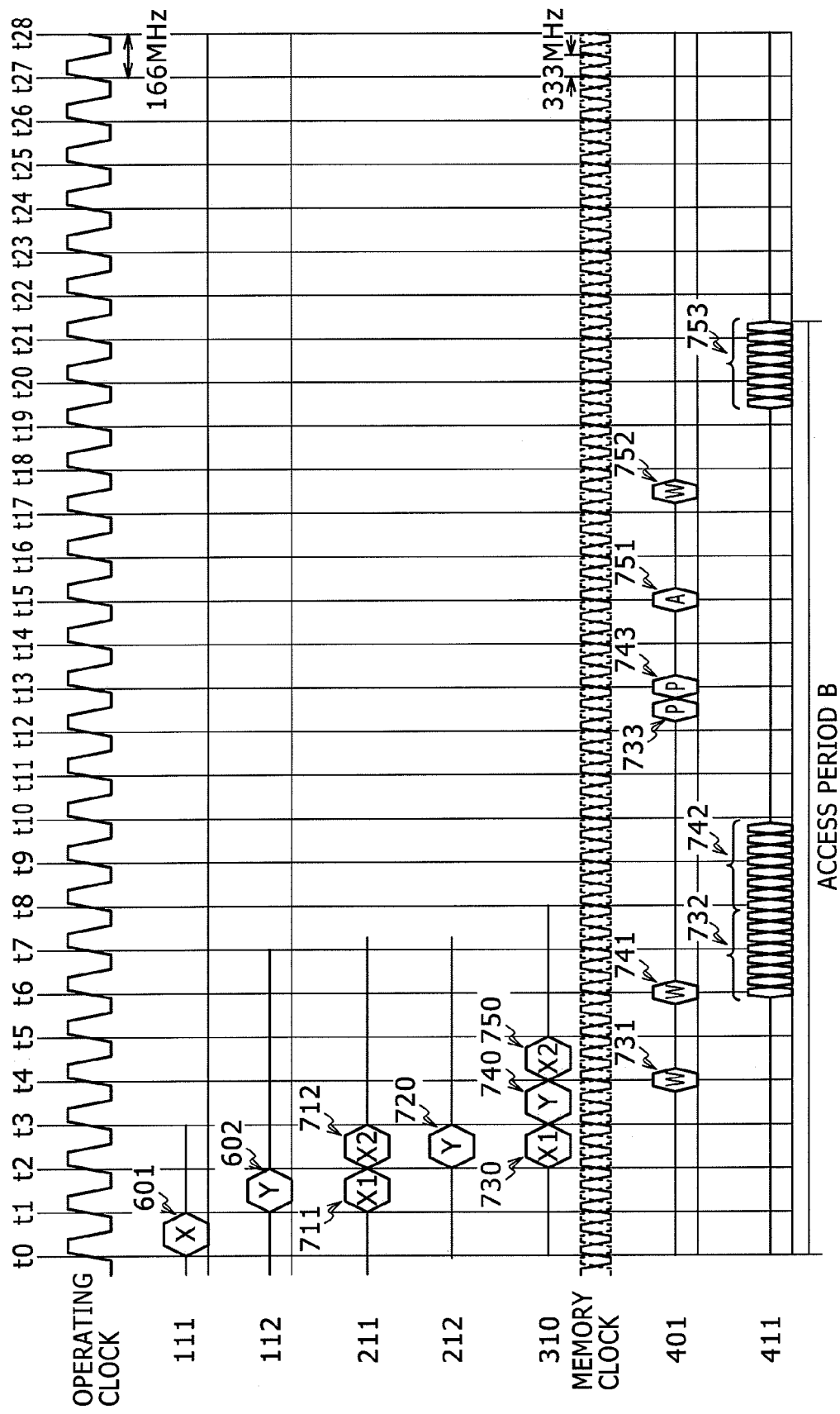
FIG. 7 is a timing chart illustrating an operation of writing to the memory system by a memory controlling device according to the first embodiment of the present invention.

FIG. 7 is a timing chart illustrating an operation of writing to the memory system 500 by the memory controlling device 200 according to the first embodiment of the present invention. FIG. 7 shows output signals of the clients 111 and 112, the adapters 211 and 212, and the arbiter 310. FIG. 7 also shows signals supplied to the command line 401 and the data line 411. In this example, the request (X) 601 and the request (Y) 602 issued from the clients 111 and 112 are similar to those shown in FIG. 6, and therefore description thereof will be omitted in the following.

At time t1, the adapter 211 converts the logical address of the request (X) 601 from the client 111 into a physical address, and outputs a divided request (X1) 711 to the arbiter 310 on the basis of the converted physical address. Then, at time t2, a divided request (X2) 712 and a divided request (Y) 720 are output from both of the adapters 211 and 212, respectively, to the arbiter 310.

In this case, the request (X) 601 is divided into the divided request (X1) 711 specifying the start address "0/0/fc" and the transfer length "4" and the divided request (X2) 712 specifying the start address "0/1/0" and the transfer length "4," as shown in FIG. 5. In addition, the start address of the request (Y) 602 from the client 112 is converted into a physical address, and a request specifying the start address "1/0/0" and the transfer length "4" is output as the divided request (Y) 720 from the adapter 212. In addition, at time t2, the arbiter 310 outputs the divided request (X1) 730 from the adapter 211.

Thereafter, at time t3, the arbiter 310 outputs the divided request (Y) 720, which is selected from the divided request (X2) 712 and the divided request (Y) 720. This is because the divided request (X2) 712 indicates the identical bank with that of the divided request (X1) 730 output immediately before and a different row from that of the divided request (X1) 730 output immediately before. Thus, the arbiter 310 selects the divided request (Y) 720 specifying a different bank (1), and outputs the selected divided request (Y) 740 to the memory controller 320. Thereafter, at time t4, the divided request (X2) 750 is output from the arbiter 310.

In addition, immediately before time t4, a writing command (W) 731 issued on the basis of the divided request (X1) 730 and specifying the "fcth" column and the transfer length "4" is output from the memory interface 400 via the command line 401. Thereby, writing data 732 from the client 111 is transferred to the memory system 500 via the data line 411. Incidentally, it is assumed in this case that an active command specifying the "0th" bank and the "0th" row was already issued before time t0.

Then, immediately before time t6, a writing command (W) 741 issued on the basis of the divided request (Y) 740 and specifying the "0th" column and the transfer length "4" is output from the memory interface 400. Thereby, following the transfer of the data 732, writing data 742 from the client 112 is transferred to the memory system 500 via the data line 411. Incidentally, it is assumed also in this case that an active command specifying the "1st" bank and the "0th" row was already issued before time t0.

Next, after time t12, a precharge command (P) 733 specifying the "0th" bank is issued via the command line 401, and a precharge command (P) 743 specifying the "1st" bank is continuously issued via the command line 401. Then, immediately before time t15, an active command (A) 751 issued on the basis of the divided request (X2) 750 and specifying the "0th" bank and the "1st" row is output from the memory interface 400 via the command line 401.

Next, immediately after time t17, a writing command (W) 752 specifying the "0th" column and the transfer length "4" is output from the memory interface 400 via the command line 401. Thereby, writing data 753 from the client 111 is transferred to the memory system 500 via the data line 411.

Thus converting the logical address of the request (X) 601 into a physical address and dividing the converted request by the row unit by the adapter 211 can shorten an access period B. That is, when the arbiter 310 receives the plurality of divided requests (X2 and Y) 712 and 720, the arbiter 310 can select the divided request to be output on the basis of the physical address of the divided request (X1) 730 output immediately before. Thereby, continuous output of divided addresses specifying different row addresses in an identical bank can be suppressed. Therefore, the period of access in the memory system 500 is shortened, and efficiency of data transfer can be improved.

Example of Operation of Memory Controlling Device 200

The operation of the memory controlling device 200 according to the embodiment of the present invention will next be described with reference to a drawing.

Figure 8:
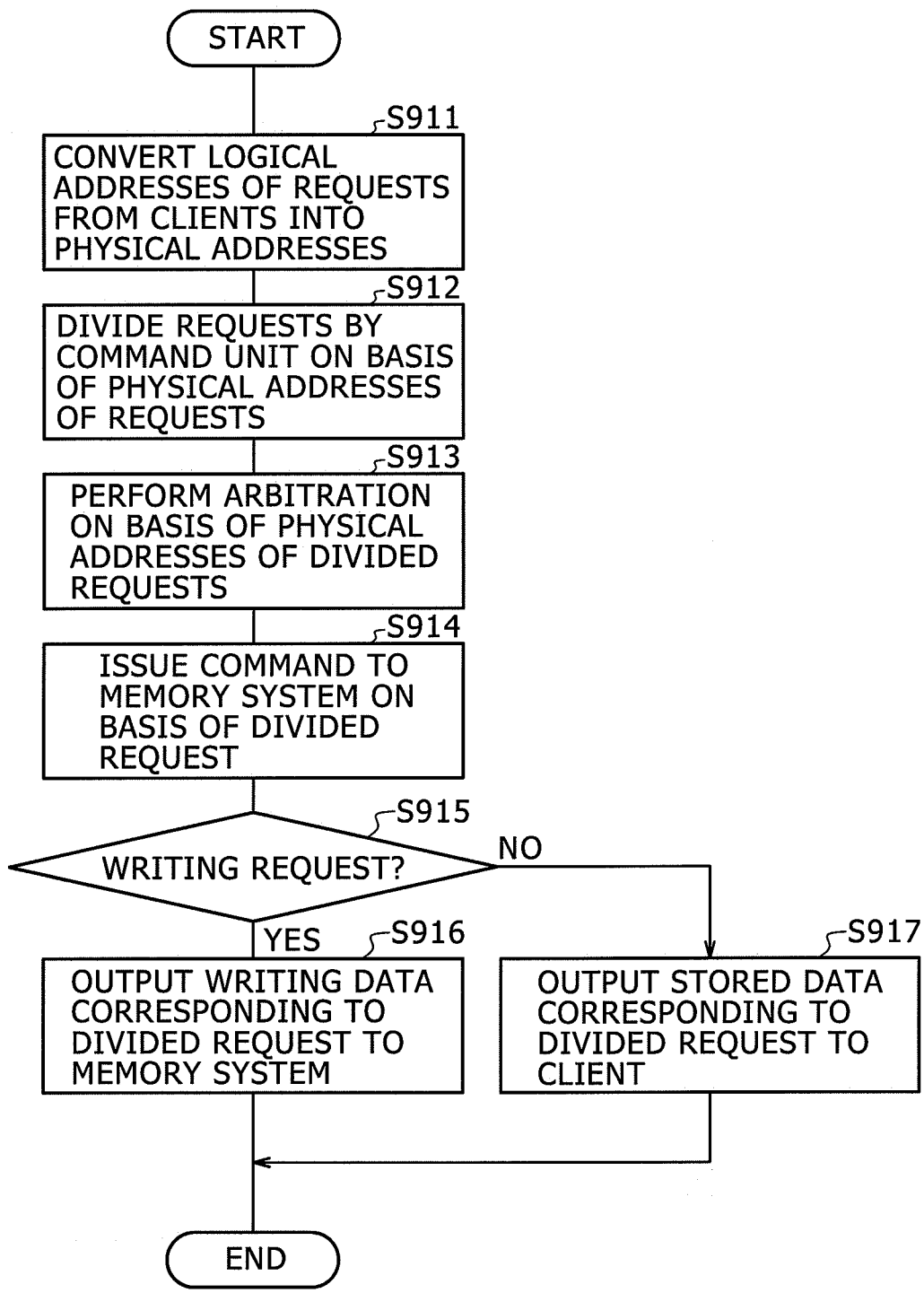
FIG. 8 is a flowchart showing an example of a process procedure of a memory controlling method of the memory controlling device according to the first embodiment of the present invention.

FIG. 8 is a flowchart showing an example of a process procedure of a memory controlling method of the memory controlling device 200 according to the first embodiment of the present invention.

First, the address converting section 220 converts the logical addresses of requests issued from the clients 111 to 114 into physical addresses of the memory system 500 (step S911). Incidentally, step S911 is an example of an address converting step described in claims. Next, the request dividing section 240 divides the converted requests output from the address converting section 220 by the command unit for the memory system 500 on the basis of the physical addresses of the converted requests (step S912). For example, the request dividing section 240 divides the converted requests by the row unit or the burst length unit in the memory system 500. Incidentally, step S912 is an example of a request dividing step described in claims.

Thereafter, the arbiter 310 performs arbitration in relation to the order of output of the divided requests output from the request dividing sections 240 corresponding to each of the clients 111 to 114 on the basis of the physical addresses of the divided requests (step S913). The arbiter 310 for example selects a divided request other than a divided request specifying an identical bank address with that of a divided request output immediately before and a different row address from that of the divided request output immediately before. Incidentally, step S913 is an example of an arbitrating step described in claims. Next, the memory controller 320 issues a command to the memory system 500 on the basis of the selected divided request (step S914).

Thereafter, the data bus controller 330 determines whether the divided request selected by the arbiter 310 is a writing request or a reading request (step S915). When the divided request is a writing request, the data bus controller 330 changes the connection of the write selector 340 on the basis of client identifying information indicated in the divided request. Thereby, writing data from the client 111 to 114 indicated in the divided request is output to the memory system 500 via the memory interface 400 (step S916).

On the other hand, when the divided request is a reading request, the data bus controller 330 changes the connection of the read selector 370 on the basis of client identifying information indicated in the divided request. Thereby, data of the physical address specified in the divided request which data is included in the data stored in the memory system 500 is output to the client indicated in the divided request (step S917). Then the memory controlling process for the divided request is ended.

Thus, in the first embodiment of the present invention, by providing the adapters 211 to 214, the arbiter 310 can suppress the output of a divided request that decreases efficiency of data transfer in the memory system 500.

Incidentally, in the first embodiment of the present invention, description has been made of a case where a request specifying a start address and a transfer length is issued from the clients 111 to 114. However, the first embodiment of the present invention is also applicable to a case where requests specifying one address are issued continuously. Accordingly, the adapters 211 to 214 in a case where requests specifying one address are issued continuously will be described as a second embodiment in the following.

2. Second Embodiment

Example of Configuration of Adapter 211

Figure 9:
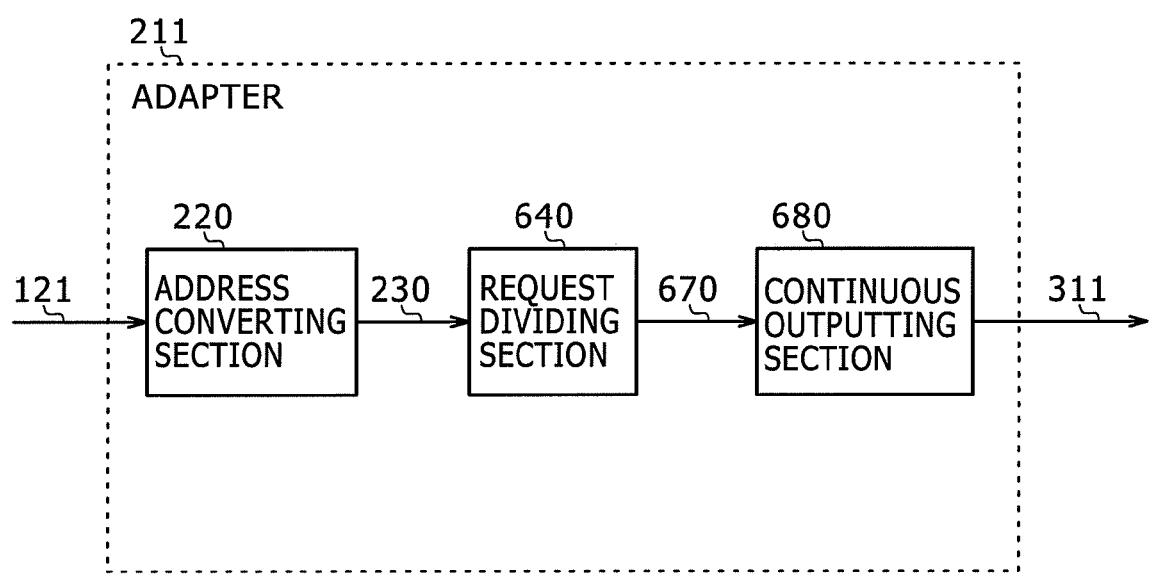
FIG. 9 is a block diagram showing an example of configuration of an adapter according to a second embodiment of the present invention.

FIG. 9 is a block diagram showing an example of configuration of an adapter 211 according to a second embodiment of the present invention. The adapter 211 includes an address converting section 220, a request dividing section 640, and a continuous outputting section 680. The address converting section 220 is similar to that shown in FIG. 2. Thus, the address converting section 220 is identified by the same reference numeral as in FIG. 2, and detailed description thereof will be omitted in the following.

The address converting section 220 converts a logical address indicated in a plurality of continuous requests issued continuously from a client 111 and specifying one logical address into a physical address. Then, the address converting section 220 outputs the plurality of converted continuous requests to the request dividing section 640.

The request dividing section 640 generates the plurality of continuous requests from the address converting section 220 into requests indicating a start address and a transfer length, and divides the generated requests by a row unit or a burst length unit in a memory system 500. The request dividing section 640 sequentially outputs the divided requests to the continuous outputting section 680 via a divided request line 670. Incidentally, the request dividing section 640 is an example of a request dividing section described in claims.

The continuous outputting section 680 continuously outputs the divided requests output sequentially from the request dividing section 640 via the divided request line 670. The continuous outputting section 680 holds the divided requests output sequentially from the request dividing section 640, and continuously outputs the plurality of retained divided requests to the arbiter 310 via a divided request line 311 on the basis of the plurality of retained divided requests. Incidentally, the continuous outputting section 680 is an example of a continuous outputting section described in claims.

Next, a concrete configuration of the request dividing section 640 and the continuous outputting section 680 will be described in the following with reference to drawings.

Example of Configuration of Request Dividing Section 640

Figure 10:
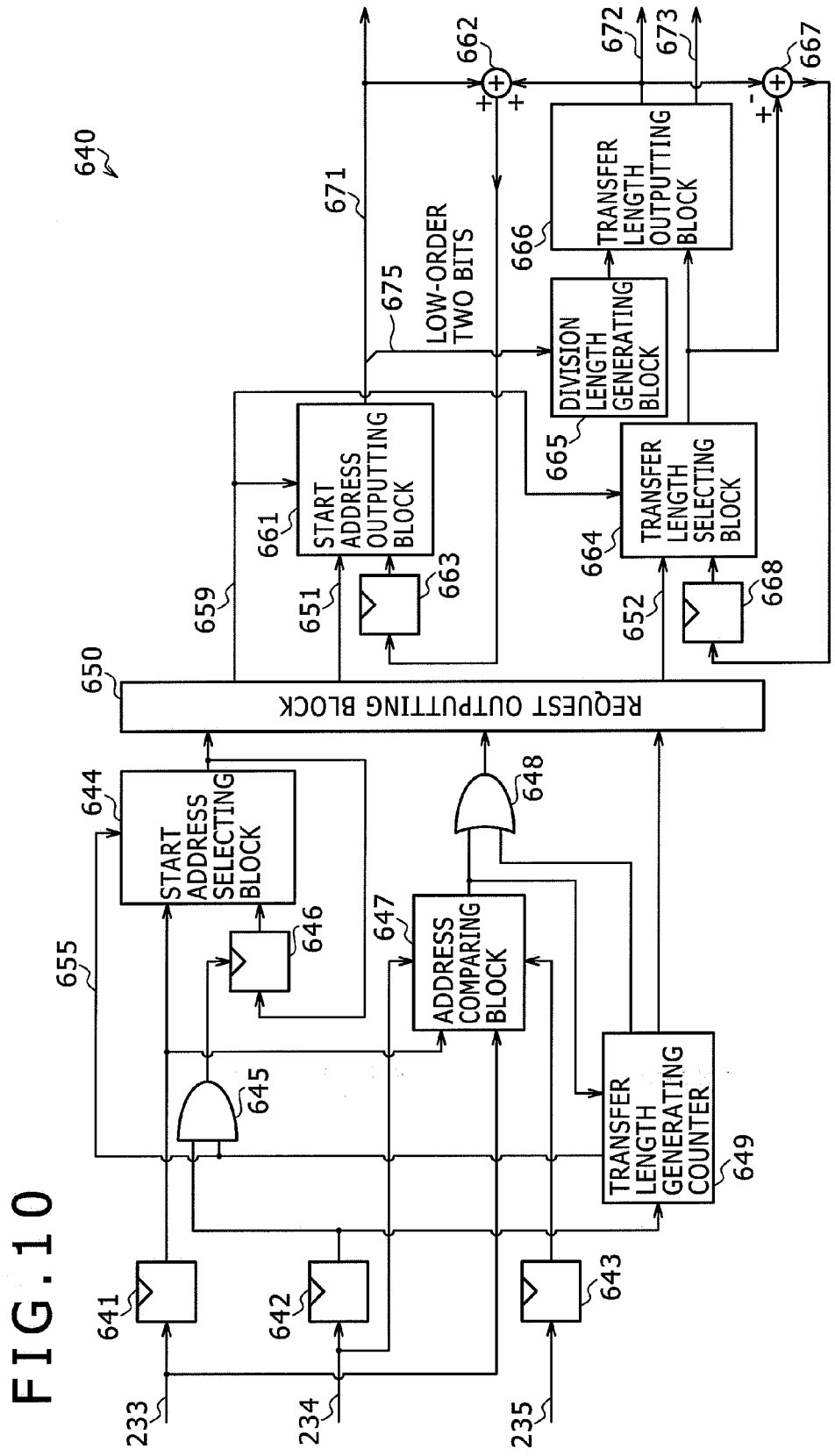
FIG. 10 is a block diagram showing an example of configuration of a request dividing section according to the second embodiment of the present invention.

FIG. 10 is a block diagram showing an example of configuration of the request dividing section 640 according to the second embodiment of the present invention. The request dividing section 640 includes an address register 641, an enable register 642, a last signal register 643, a start address selecting block 644, a start address determining block 645, and a start address register 646. The request dividing section 640 further includes an address comparing block 647, a request obtaining signal generating block 648, a transfer length generating counter 649, and a request outputting block 650.

In addition, the request dividing section 640 includes a start address outputting block 661, a next start address calculating block 662, and a next start address register 663. In addition, the request dividing section 640 includes a transfer length selecting block 664, a division length generating block 665, a transfer length outputting block 666, a differential transfer length calculating block 667, and a differential transfer length register 668. Incidentally, the configuration of these blocks is similar to that shown in FIG. 4, and therefore description thereof will be omitted in the following.

In addition, FIG. 10 shows an address line 233, an address enable line 234, and a last signal line 235 included in a converted request line 230. The address line 233 is supplied with the physical address of a continuous request converted by the address converting section 220. In addition, the address enable line 234 is supplied with an enable signal indicating whether the physical address supplied to the address line 233 is valid or not. Further, the last signal line 235 is supplied with a last signal indicating a termination of a plurality of continuous requests converted by the address converting section.

The address register 641 retains the physical address supplied from the address line 233. The address register 641 outputs the retained physical address to the start address selecting block 644 and the address comparing block 647.

The enable register 642 retains the enable signal supplied from the address enable line 234. The enable register 642 outputs the retained enable signal to the start address determining block 645 and the transfer length generating counter 649.

The last signal register 643 retains the last signal supplied from the last signal line 235. The last signal register 643 outputs the retained last signal to the address comparing block 647.

The start address selecting block 644 is a selector for selecting one of the address register 641 and the start address register 646 on the basis of an initializing signal output from the transfer length generating counter 649 when the count value of the transfer length generating counter 649 is an initial value. When the initial value signal is output from the transfer length generating counter 649, the start address selecting block 644 selects the address retained in the address register 641.

On the other hand, when the initial value signal is not output from the transfer length generating counter 649, the start address selecting block 644 selects the start address retained in the start address register 646. In addition, the start address selecting block 644 outputs the selected address or the selected start address to the request outputting block 650 and the start address register 646.

The start address determining block 645 determines whether or not to make the start address register 646 hold output from the start address selecting block 644 on the basis of the enable signal from the enable register 642 and the initial value signal from the transfer length generating counter 649. When the start address determining block 645 simultaneously receives the enable signal and the initial value signal, the start address determining block 645 makes the start address register 646 hold the address from the start address selecting block 644 as a start address. Otherwise the start address determining block 645 does not make the start address register 646 hold the address output from the start address selecting block 644.

In addition, the start address determining block 645 outputs a holding signal for making the start address register 646 hold the output from the start address selecting block 644 to the start address register 646. The start address determining block 645 is for example realized by a logical product circuit. In this example, when an "H (High)" is output as initial value signal from the transfer length generating counter 649 and an "H" is output as enable signal from the enable register 642, the start address determining block 645 outputs an "H" as holding signal. Otherwise the start address determining block 645 outputs an "L (Low)."

The start address register 646 holds the address selected by the start address selecting block 644 as a start address on the basis of the holding signal from the start address determining block 645. The start address register 646 outputs the retained start address to the start address selecting block 644.

The address comparing block 647 compares the address retained in the address register 641 with an address to be retained next in the address register 641, and thereby determines whether the two addresses are continuous with each other. The address comparing block 647 compares the address supplied from the address line 233 and the address retained in the address register 641 with each other on the basis of the enable signal from the address enable line 234 and the last signal from the last signal register 643.

When the address comparing block 647 is supplied with the enable signal from the address enable line 234, the address comparing block 647 compares the address supplied from the address line 233 with the immediately preceding address supplied from the address line 233 to determine whether the two addresses are continuous with each other. That is, the address comparing block 647 determines that the two addresses are continuous with each other when a bank address from the address line 233 is identical, a row address from the address line 233 is identical, and a column address from the address line 233 is larger by one as compared with the address retained in the address register 641. Otherwise the address comparing block 647 determines that the address from the address line 233 and the address from the address register 641 are not continuous with each other.

In addition, when the address comparing block 647 determines that the addresses are not continuous with each other, the address comparing block 647 outputs a discontinuity signal to the request obtaining signal generating block 648 and the transfer length generating counter 649. In addition, when the address comparing block 647 is supplied with the last signal from the last signal register 643, the address comparing block 647 outputs the discontinuity signal to the request obtaining signal generating block 648 and the transfer length generating counter 649 without performing address comparison.

The transfer length generating counter 649 is a counter that increments a count value by one at a time on the basis of the enable signal from the enable register 642 when the address comparing block 647 determines that the addresses are continuous with each other. The transfer length generating counter 649 outputs the incremented count value as transfer length to the request outputting block 650.

In addition, when the transfer length generating counter 649 is supplied with the discontinuity signal from the address comparing block 647, the transfer length generating counter 649 sets the count value to "1" as an initial value, and supplies the initial value signal to the start address selecting block 644 and the start address determining block 645 via an initial value signal line 655. In addition, when the count value coincides with a certain transfer length threshold value, the transfer length generating counter 649 supplies a coincidence signal to the request obtaining signal generating block 648, and thereafter sets the count value to the initial value.

The request obtaining signal generating block 648 generates a request obtaining signal for making the request outputting block 650 obtain the start address output from the start address selecting block 644 and the transfer length output from the transfer length generating counter 649. The request obtaining signal generating block 648 generates the request obtaining signal on the basis of the discontinuity signal from the address comparing block 647 or the coincidence signal from the transfer length generating counter 649. In addition, the request obtaining signal generating block 648 outputs the generated request obtaining signal to the request outputting block 650.

The request obtaining signal generating block 648 is for example realized by a logical sum circuit. In this example, when an "H" is supplied as discontinuity signal from the address comparing block 647 or an "H" is supplied as coincidence signal from the transfer length generating counter 649, the request obtaining signal generating block 648 outputs an "H" as request obtaining signal.

The request outputting block 650 obtains the start address output from the start address selecting block 644 and the transfer length output from the transfer length generating counter 649 on the basis of the request obtaining signal from the request obtaining signal generating block 648. Thereby, a request indicating a start address and a transfer length is generated from a plurality of continuous requests. Then, the request outputting block 650 supplies an initializing signal to an initializing signal line 659 indicating timing of supplying the generated request, and outputs the start address and the transfer length to a start address line 651 and a transfer length line 652, respectively.

Example of Dividing Continuous Requests by Request Dividing Section 640

Figure 11:
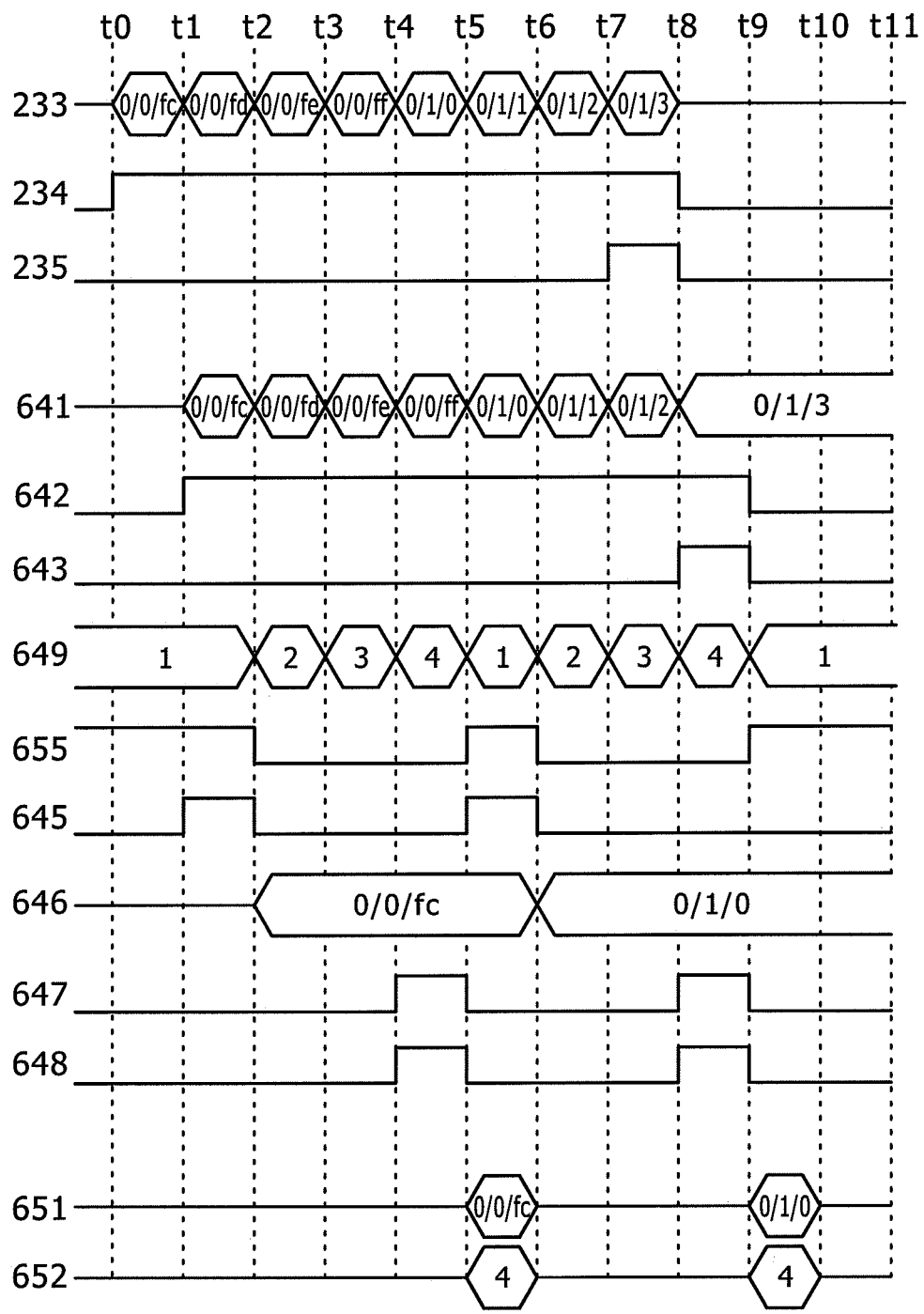
FIG. 11 is a timing chart showing an example of dividing converted requests by the request dividing section according to the second embodiment of the present invention.

FIG. 11 is a timing chart showing an example of dividing continuous requests by the request dividing section 640 according to the second embodiment of the present invention. This timing chart shows an example of generating a range specifying request as a request output from the request outputting block 650.

It is assumed in this case that eight continuous requests from an address (0/0/fc) of a 0th bank, a 0th row, and an fcth column to an address (0/1/3) of the 0th bank, a 1st row, and a 3rd column are supplied from the address converting section 220. In this example, a termination column address of the 0th row is an ffth column address. That is, a case where a range to be accessed in the memory system 500 spans the 0th and 1st rows is assumed. In addition, suppose that time passes from a left to a right (time t0 to t11).

FIG. 11 shows output signals from the address line 233, the address enable line 234, and the last signal line 235 included in the converted request line 230. In addition, FIG. 11 shows output signals from the address register 641, the enable register 642, the last signal register 643, the transfer length generating counter 649, the initial value signal line 655, and the start address determining block 645. Further, FIG. 11 shows output signals from the start address register 646, the address comparing block 647, and the request obtaining signal generating block 648. In addition, FIG. 11 shows output signals from the start address line 651 and the transfer length line 652. In this case, the count value of the transfer length generating counter 649 immediately before time t0 is the initial value of "1."

First, addresses from the address "0/0/fc" of the first continuous request to the address "0/1/3" of the eighth continuous request are continuously output from the address line 233 from time t0 to time t7. Together with this, an enable signal is output from the address enable line 234. In addition, at time t7, a last signal is output from the last signal line 235.

In this case, at time t1, the address register 641 holds the address "0/0/fc" of the first continuous request, and the enable register 642 holds the enable signal. Together with this, because the count value of the transfer length generating counter 649 remains "1," an initializing signal is output from the initial value signal line 655, and the start address selecting block 644 outputs the address "0/0/fc" of the first continuous request from the address register 641.

At this time, because the initializing signal is output and the enable signal is output from the enable register 642, a holding signal is output from the start address determining block 645. In addition, because the address "0/0/fc" of the first continuous request which address is retained in the address register 641 and the address "0/0/fd" of the second continuous request which address is output from the address line 233 are continuous with each other, the address comparing block 647 does not output a discontinuity signal.

At time t2, the address register 641 holds the address "0/0/fd" of the second continuous request, and the enable register 642 holds the enable signal. Together with this, the start address register 646 holds the address "0/0/fc" of the first continuous request which address is output from the start address selecting block 644 on the basis of the holding signal from the start address determining block 645 at time t1.

At this time, because the discontinuity signal is not output from the address comparing block 647 at time t1, and the enable signal is output from the enable register 642, the count value of the transfer length generating counter 649 is set to "2." In addition, because the address "0/0/fd" of the second continuous request which address is retained in the address register 641 and the address "0/0/fe" of the third continuous request which address is output from the address line 233 are continuous with each other, the address comparing block 647 does not output the discontinuity signal.

At time t3, the address register 641 holds the address "0/0/fe" of the third continuous request, and the enable register 642 holds the enable signal. Because the discontinuity signal is not output from the address comparing block 647 at time t2, and the enable signal is output from the enable register 642, the counter value of the transfer length generating counter 649 is set to "3." At this time, because the address "0/0/fe" of the third continuous request which address is retained in the address register 641 and the address "0/0/ff" of the fourth continuous request which address is output from the address line 233 are continuous with each other, the address comparing block 647 does not output the discontinuity signal.

At time t4, the address register 641 holds the address "0/0/ff" of the fourth continuous request, and the enable register 642 holds the enable signal. Because the discontinuity signal is not output from the address comparing block 647 at time t3, and the enable signal is output from the enable register 642, the counter value of the transfer length generating counter 649 is set to "4."

At this time, because the address "0/0/ff" of the fourth continuous request which address is retained in the address register 641 and the address "0/1/0" of the fifth continuous request which address is output from the address line 233 are not continuous with each other, the address comparing block 647 outputs the discontinuity signal. Thereby, a request obtaining signal is output from the request obtaining signal generating block 648, and the request outputting block 650 obtains the start address "0/0/fc" retained in the start address register 646 and the transfer length "4" as the count value of the transfer length generating counter 649.

At time t5, the address register 641 holds the address "0/1/0" of the fifth continuous request, and the enable register 642 holds the enable signal. Because the discontinuity signal is output from the address comparing block 647 at time t4, the counter value of the transfer length generating counter 649 is set to the initial value of "1." Thereby, the initial value signal is output from the transfer length generating counter 649. The start address determining block 645 is thus supplied with the initial value signal, and supplied with the enable signal from the enable register 642. Therefore the holding signal is output from the start address determining block 645. In addition, on the basis of the initial value signal, the address "0/1/0" of the fifth continuous request which address is retained in the address register 641 is output from the start address selecting block 644.

At this time, because the address "0/1/0" of the fifth continuous request which address is retained in the address register 641 and the address "0/1/1" of the sixth continuous request which address is output from the address line 233 are continuous with each other, the address comparing block 647 does not output the discontinuity signal. In addition, the address "0/0/fc" and the transfer length "4" obtained by the request outputting block 650 at time t4 are supplied as a first range specifying request to the start address line 651 and the transfer length line 652, respectively.

At time t6, the address register 641 holds the address "0/1/1" of the sixth continuous request, and the enable register 642 holds the enable signal. Together with this, the start address register 646 holds the address "0/1/0" of the fifth continuous request which address is output from the start address selecting block 644 on the basis of the holding signal from the start address determining block 645 at time t5. In addition, because the discontinuity signal is not output from the address comparing block 647 at time t5, and the enable signal is output from the enable register 642, the counter value of the transfer length generating counter 649 is set to "2."

At this time, because the address "0/1/1" of the sixth continuous request which address is retained in the address register 641 and the address "0/1/2" of the seventh continuous request which address is output from the address line 233 are continuous with each other, the address comparing block 647 does not output the discontinuity signal.

At time t7, the address register 641 holds the address "0/1/2" of the seventh continuous request, and the enable register 642 holds the enable signal. Because the discontinuity signal is not output from the address comparing block 647 at time t6, and the enable signal is output from the enable register 642, the counter value of the transfer length generating counter 649 is set to "3." At this time, because the address "0/1/2" of the seventh continuous request which address is retained in the address register 641 and the address "0/1/3" of the eighth continuous request which address is output from the address line 233 are continuous with each other, the address comparing block 647 does not output the discontinuity signal.

At time t8, the address register 641 holds the address "0/1/3" of the eighth continuous request, the enable register 642 holds the enable signal, and the last signal register 643 holds a last signal. In addition, because the discontinuity signal is not output from the address comparing block 647 at time t7, and the enable signal is output from the enable register 642, the count value of the transfer length generating counter 649 is set to "4."

At this time, because the last signal is output from the last signal register 643, the address comparing block 647 outputs the discontinuity signal. Thereby, the request obtaining signal is output from the request obtaining signal generating block 648, and the request outputting block 650 obtains the start address "0/1/0" retained in the start address register 646 and the transfer length "4" as the count value of the transfer length generating counter 649.

At time t9, the request outputting block 650 supplies the start address "0/1/0" and the transfer length "4" obtained by the request outputting block 650 at time t8 as a second range specifying request to the start address line 651 and the transfer length line 652, respectively.

Thus, the first to eighth continuous requests are converted into the first range specifying request indicating the address "0/0/fc" and the transfer length "4" and the second range specifying request indicating the address "0/1/0" and the transfer length "4." That is, when a plurality of continuous requests specifying one address are sequentially output from the address converting section 220 to the request dividing section 640, the request dividing section 640 generates a range specifying request indicating a start address by a physical address and a transfer length on the basis of the plurality of continuous requests. Incidentally, the continuous requests and the range specifying requests are an example of a first converted request and a second converted request described in claims.

Incidentally, thus converting a plurality of continuous requests into range specifying requests causes a vacant time (time t6 to t8) between the two converted range specifying requests. An example in which two range specifying requests generated by the request outputting block 650 are output from the divided request line 670 will next be described with reference to a drawing.

Figure 12:
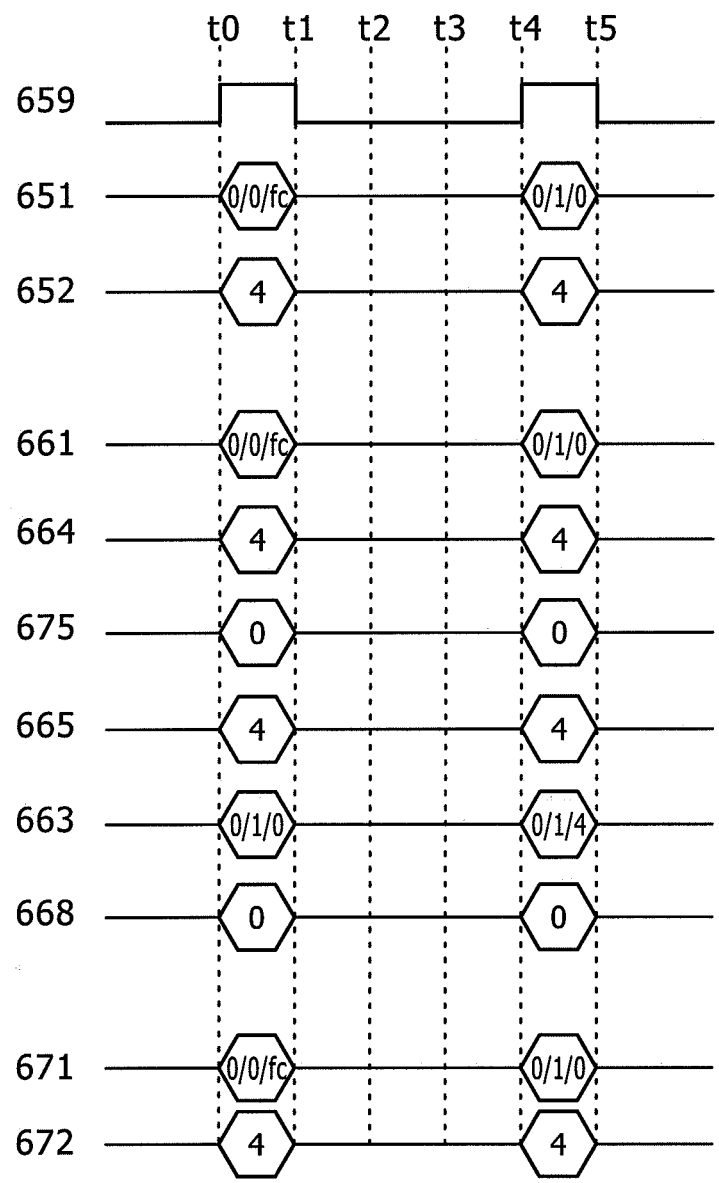
FIG. 12 is a timing chart showing an example in which a first and a second range specifying request shown in FIG. 11 are output from a divided request line.

FIG. 12 is a timing chart showing an example in which the first and second range specifying requests shown in FIG. 11 are output from the divided request line 670. It is assumed in this case that the first range specifying request indicating the start address "0/0/fc" and the transfer length "4" and the second range specifying request indicating the start address "0/1/0" and the transfer length "4" as shown in FIG. 11 are output from the request outputting block 650. In addition, suppose that the division length generating block 665 generates a division length on the basis of the example of the division length correspondence table based on the DDR standards as described with reference to FIG. 4.

FIG. 12 shows the initializing signal line 659, the start address line 651, and the transfer length line 652. In addition, FIG. 12 shows the start address outputting block 661, the transfer length selecting block 664, column address line 675, the division length generating block 665, the next start address register 663, and the differential transfer length register 668. Further, FIG. 12 shows a start address line 671 and a transfer length line 672 included in the divided request line 670. In addition, suppose that time passes from a left to a right (time t0 to t5).

At time t0, an initializing signal is supplied from the initializing signal line 659, and the start address "0/0/fc" and the transfer length "4" of the first range specifying request are supplied from the start address line 651 and the transfer length line 652, respectively.

In this case, because the initializing signal is supplied to the start address outputting block 661, the start address outputting block 661 outputs the start address "0/0/fc" of the first range specifying request to the start address line 671 of the divided request line 670. Together with this, because the initializing signal is also supplied to the transfer length selecting block 664, the transfer length selecting block 664 outputs the transfer length "4" of the first range specifying request from the transfer length line 652.

At this time, because the low-order two bits of the start column address (fc) from the column address line 675 indicates "0," a division length "4" is output from the division length generating block 665. Then, because the transfer length "4" from the transfer length line 652 and the division length "4" from the division length generating block 665 are equal to each other, the transfer length outputting block 666 outputs "4" as division length to the transfer length line 672 of the divided request line 670. Incidentally, the transfer length outputting block 666 outputs an enable signal to a request enable line 673 in synchronism with timing of the output to the transfer length line 672.

Thereby, the start address "0/0/fc" and the transfer length "4" are output as a first divided request to the divided request line 670. Then a dividing process for the first range specifying request is ended.

Together with this, the next start address register 663 holds the next start address "0/1/0" obtained by adding the division length "4" to the start address "0/0/fc" of the converted request in the next start address calculating block 662. In addition, the differential transfer length register 668 holds a differential transfer length "0" obtained by subtracting the output "4" of the transfer length outputting block 666 from the output "4" of the transfer length selecting block 664 in the differential transfer length calculating block 667.

Next, at time t4, the initializing signal is supplied from the initializing signal line 659, and the start address "0/1/0" and the transfer length "4" of the second range specifying request are supplied from the start address line 651 and the transfer length line 652, respectively.

In this case, because the initializing signal is supplied to the start address outputting block 661, the start address outputting block 661 outputs the address "0/1/0" of the second range specifying request to the start address line 671 of the divided request line 670. Together with this, because the initializing signal is also supplied to the transfer length selecting block 664, the transfer length selecting block 664 outputs the transfer length "4" of the second range specifying request from the transfer length line 652.

At this time, because the low-order two bits of the start column address (0) from the column address line 675 indicates "0," a division length "4" is output from the division length generating block 665. Then, because the transfer length "4" from the transfer length line 652 and the division length "4" from the division length generating block 665 are equal to each other, the transfer length outputting block 666 outputs "4" as division length to the transfer length line 672 of the divided request line 670.

Thereby, the start address "0/1/0" and the transfer length "4" are output as a second divided request to the divided request line 670. Then a dividing process for the second range specifying request is ended.

Thus, an output interval (time t1 to t3) between the first and second range specifying requests output from the request outputting block 650 is maintained when the requests are output to the divided request line 670. In this case, the output interval between the range specifying requests output from the request outputting block 650 occurs due to a break of rows in the memory system 500. However, the output interval occurs also when the count value set in the transfer length generating counter 649 reaches a transfer length threshold value. At this time, a vacant time occurs between a plurality of divided requests specifying an identical row address of an identical bank. This vacant time may decrease the data transfer efficiency of the memory system 500.

The data transfer efficiency of the memory system 500 is decreased when the arbiter 310 is supplied with another divided request that specifies an identical bank address with that of the plurality of divided requests specifying the identical row address of the identical bank between which requests the vacant time occurs and which specifies a different row address from that of these divided requests, for example. In this case, divided requests specifying the different row addresses of the identical bank are continuously output from the arbiter 310. Thus the data transfer efficiency of the memory system 500 is decreased significantly.

Thus, by providing the continuous outputting section 680 to the adapter 211 to continuously output divided requests output from the request dividing section 640, the decrease in the data transfer efficiency of the memory system 500 can be suppressed. An example of configuration of the continuous outputting section 680 will be described in the following with reference to a drawing.

Example of Configuration of Continuous Outputting Section 680

Figure 13:
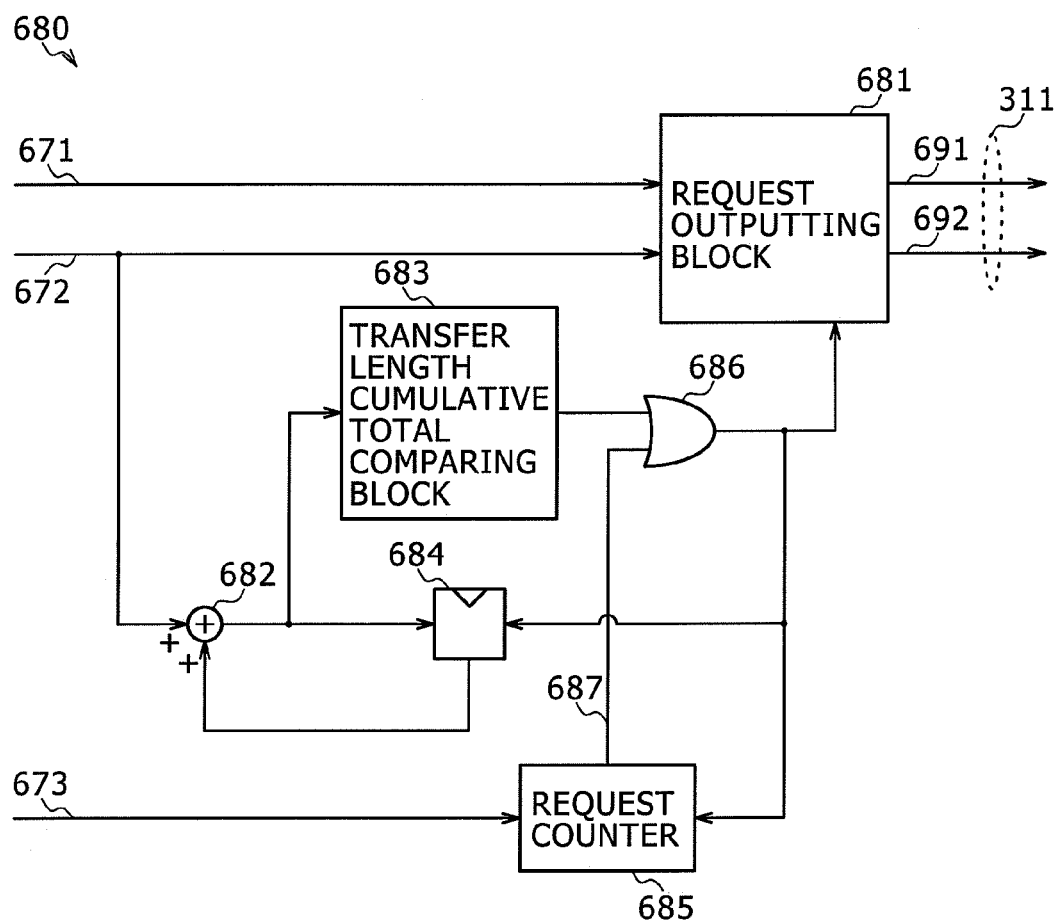
FIG. 13 is a block diagram showing an example of configuration of a continuous outputting section according to the second embodiment of the present invention.

FIG. 13 is a block diagram showing an example of configuration of the continuous outputting section 680 according to the second embodiment of the present invention.

The continuous outputting section 680 includes a request outputting block 681, a transfer length adding block 682, a transfer length cumulative total comparing block 683, a transfer length cumulative total value register 684, a request counter 685, and an output signal generating block 686.

The request outputting block 681 continuously outputs a plurality of divided requests divided by the request dividing section 640. The request outputting block 681 sequentially holds divided requests indicating start addresses and transfer lengths supplied from the start address line 671 and the transfer length line 672. Then, the request outputting block 681 continuously outputs the plurality of retained divided requests on the basis of an output signal generated by the output signal generating block 686. That is, the request outputting block 681 holds divided requests sequentially output from the request dividing section 640, and continuously outputs a plurality of divided requests on the basis of the plurality of retained divided requests.

In addition, the request outputting block 681 sequentially outputs the start addresses of the plurality of retained divided requests and the transfer lengths corresponding to the start addresses to a start address line 691 and a transfer length line 692 included in the divided request line 311. Incidentally, the request outputting block 681 is an example of a continuous outputting section described in claims.

The transfer length adding block 682 adds together a transfer length supplied from the request dividing section 640 via the transfer length line 672 and a transfer length cumulative total value retained in the transfer length cumulative total value register 684. The transfer length adding block 682 outputs a result of the addition as a transfer length cumulative total value to the transfer length cumulative total comparing block 683 and the transfer length cumulative total value register 684.

The transfer length cumulative total comparing block 683 compares the transfer length cumulative total value calculated by the transfer length adding block 682 with a certain cumulative total threshold value. When the transfer length cumulative total value calculated by the transfer length adding block 682 becomes the cumulative total threshold value or more, the transfer length cumulative total comparing block 683 outputs a transfer length signal to the output signal generating block 686.

The transfer length cumulative total value register 684 retains the transfer length cumulative total value calculated by the transfer length adding block 682. The transfer length cumulative total value register 684 sets the value retained in the transfer length cumulative total value register to an initial value of "0" on the basis of the output signal for outputting the plurality of divided requests retained in the request outputting block 681.

The request counter 685 is a counter that increments the count value of the request counter 685 by one at a time on the basis of the enable signal indicating a divided request output from the request dividing section 640 via the request enable line 673. When the count value becomes a certain count threshold value, the request counter 685 outputs a count signal to the output signal generating block 686 via a signal line 687. The request counter 685 sets the count value to an initial value of "0" on the basis of the output signal from the output signal generating block 686.

The output signal generating block 686 generates the output signal when receiving the transfer length signal from the transfer length cumulative total comparing block 683 or the count signal from the request counter 685. The output signal generating block 686 outputs the generated output signal to the request outputting block 681, the transfer length cumulative total value register 684, and the request counter 685.

The output signal generating block 686 is for example realized by a logical sum circuit. In this example, when an "H" is supplied as transfer length signal from the transfer length cumulative total comparing block 683 or an "H" is supplied as count signal from the request counter 685, the output signal generating block 686 outputs an "H" as output signal.

Thus, by being provided with the transfer length cumulative total comparing block 683, the continuous outputting section 680 can continuously output a plurality of divided requests on the basis of the cumulative total threshold value relating to the cumulative total of the transfer lengths indicated in the plurality of divided requests. Thereby an access delay caused by retaining divided requests can be reduced.

In addition, by being provided with the request counter 685, the continuous outputting section 680 can continuously output a plurality of divided requests on the basis of the counter threshold value relating to the number of the plurality of divided requests. Thereby, as with the transfer length cumulative total comparing block 683, an access delay caused by retaining divided requests can be reduced. Next, an example of output of divided requests output by the continuous outputting section 680 will be described in the following with reference to a drawing.

Example of Output of Divided Requests by Continuous Outputting Section 680

Figure 14:
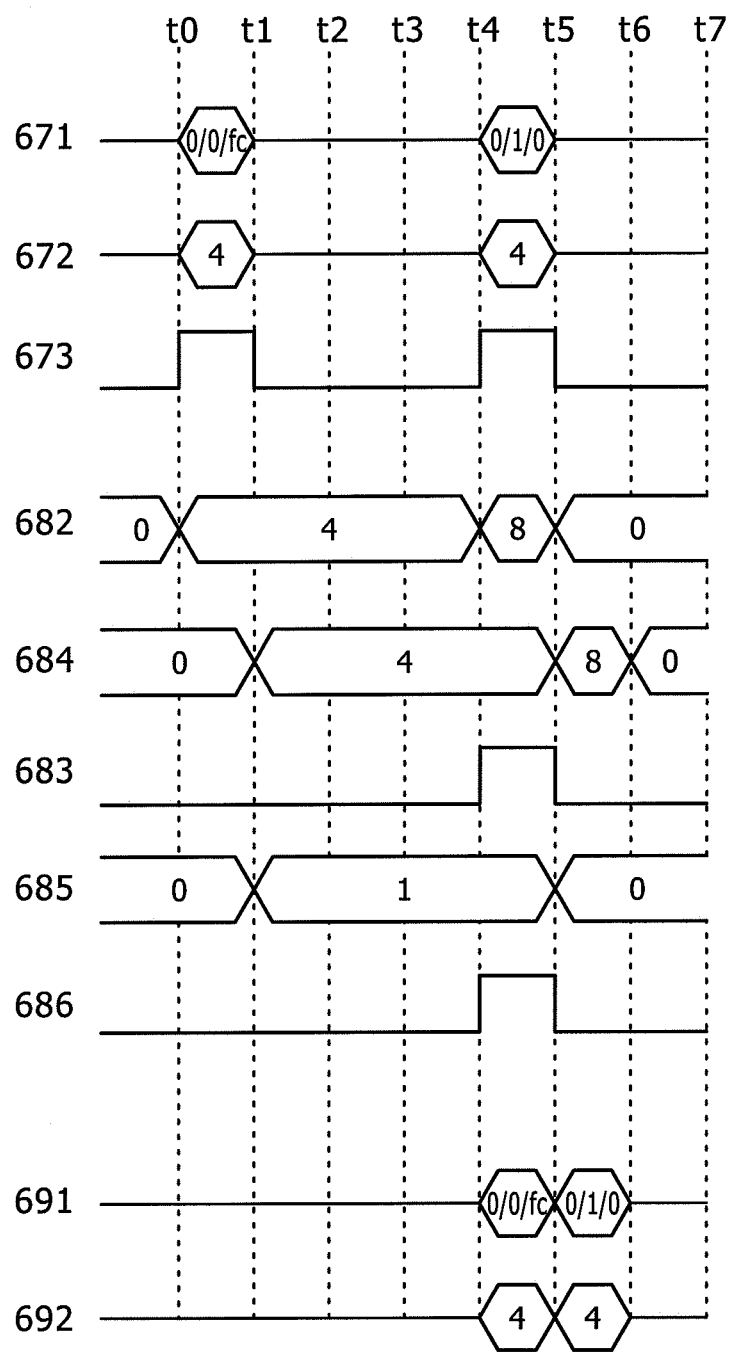
FIG. 14 is a timing chart showing an example of output of divided requests by the continuous outputting section according to the second embodiment of the present invention.

FIG. 14 is a timing chart showing an example of output of divided requests by the continuous outputting section 680 according to the second embodiment of the present invention. FIG. 14 shows output signals of the start address line 671, the transfer length line 672, and the request enable line 673 included in the divided request line 670. In addition, FIG. 14 shows output signals of the transfer length adding block 682, the transfer length cumulative total value register 684, the transfer length cumulative total comparing block 683, the request counter 685, and the output signal generating block 686. Further, FIG. 14 shows output signals of the start address line 691 and the transfer length line 692 included in the divided request line 311.

It is assumed in this case that a first divided request specifying a start address "0/0/fc" and a transfer length "4" and a second divided request specifying a start address "0/1/0" and a transfer length "4" are supplied from the request dividing section 640. In addition, suppose that the transfer length cumulative total value register 684 and the request counter 685 are each set to the initial value of "0" immediately before time t0. In addition, suppose that the cumulative total threshold value set in the transfer length cumulative total comparing block 683 is "8." Suppose in this case that time passes from a left to a right (time t0 to t7).

First, at time t0, the start address "0/0/fc" and the transfer length "4" of the first divided request are supplied from the start address line 671 and the transfer length line 672, and an enable signal is supplied from the request enable line 673. At this time, the transfer length adding block 682 outputs a transfer length cumulative total value "4" obtained by adding together the transfer length "4" from the transfer length line 672 and "0" as the initial value of the transfer length cumulative total value register 684 to the transfer length cumulative total comparing block 683 and the transfer length cumulative total value register 684.

At time t1, the transfer length cumulative total value register 684 holds the transfer length cumulative total value "4" from the transfer length adding block 682. Then, the count value of the request counter 685 is set to "1" on the basis of the enable signal from the request enable line 673.

Next, at time t4, the start address "0/1/0" and the transfer length "4" of the second divided request are supplied from the start address line 671 and the transfer length line 672, and the enable signal is supplied from the request enable line 673. At this time, the transfer length adding block 682 adds together the transfer length "4" from the transfer length line 672 and the transfer length cumulative total value "4" retained in the transfer length cumulative total value register 684, and outputs "8" as a new transfer length cumulative total value. Then, because the transfer length cumulative total value "8" output from the transfer length adding block 682 is equal to the cumulative total threshold value "8," the transfer length cumulative total comparing block 683 outputs a transfer length signal to the output signal generating block 686.

Thereby, on the basis of an output signal from the output signal generating block 686, the start address "0/0/fc" and the transfer length "4" of the first divided request retained in the request outputting block 681 are supplied to the start address line 691 and the transfer length line 692, respectively. Next, at time t5, the start address "0/1/0" and the transfer length "4" of the second divided request retained in the request outputting block 681 are supplied to the start address line 691 and the transfer length line 692, respectively. In addition, the transfer length cumulative total value register 684 and the request counter 685 are each set to the initial value "0" on the basis of the output signal from the output signal generating block 686.

Thus, by providing the continuous outputting section 680, the first and second divided requests output from the request dividing section 640 can be output to the arbiter 310 continuously. It is thus possible to suppress a decrease in the transfer efficiency of the memory system 500 which decrease is caused by selecting a divided request from another client between the first and second divided requests in the arbiter 310.

Next, there is a case where divided requests can be combined into one divided request by changing the order of a plurality of continuous requests, which case will be described in the following as an example of modification of the adapter 211 according to the second embodiment of the present invention with reference to drawings.

Example of Modification of Configuration of Adapter 211

Figure 15:
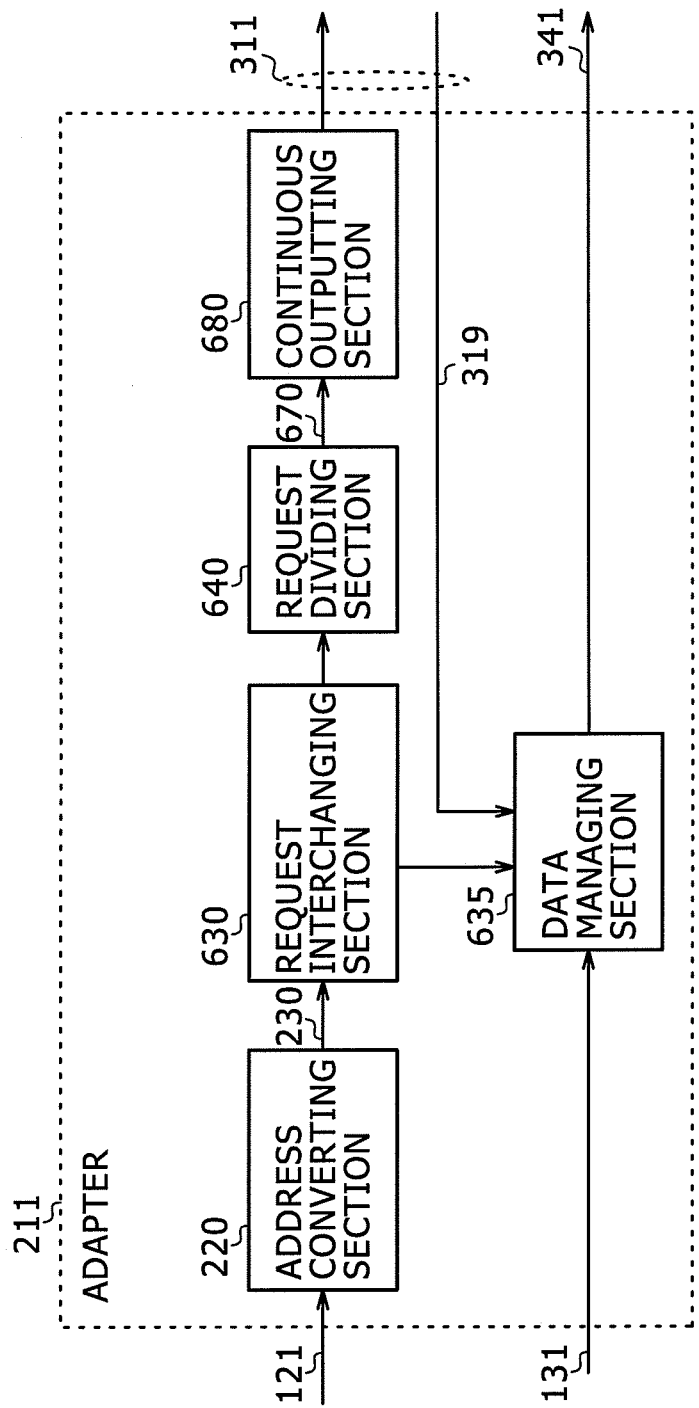
FIG. 15 is a block diagram showing an example of modification of configuration of the adapter according to the second embodiment of the present invention.

FIG. 15 is a block diagram showing an example of modification of configuration of the adapter 211 according to the second embodiment of the present invention. This adapter 211 includes a request interchanging section 630 and a data managing section 635 in addition to the configuration shown in FIG. 9. In this case, the configuration other than the request interchanging section 630 and the data managing section 635 is similar to that of FIG. 9. Thus, the same reference numerals as in FIG. 9 are applied, and detailed description of the configuration other than the request interchanging section 630 and the data managing section 635 will be omitted in the following.

The request interchanging section 630 changes the order of a plurality of continuous requests converted into physical addresses by an address converting section 220. When the request interchanging section 630 receives a plurality of continuous requests having nonconsecutive addresses, for example, the request interchanging section 630 rearranges the requests so as to make the addresses indicated in the requests consecutive addresses. In addition, the request interchanging section 630 for example interchanges continuous requests according to a certain access order for columns in the memory system 500. In addition, the request interchanging section 630 supplies request interchange information on the order of the interchanged continuous requests to the data managing section 635. In addition, the request interchanging section 630 supplies the interchanged continuous requests to a request dividing section 640.

The data managing section 635 interchanges writing data from the client 111 via the data line 131 on the basis of the request interchange information supplied from the request interchanging section 630. The data managing section 635 retains writing data output from the client 111, and interchanges writing data corresponding to the interchanged continuous requests which writing data is included in the retained writing data on the basis of the request interchange information. In addition, the data managing section 635 outputs writing data corresponding to a divided request allowed access to the memory system 500 to the write selector 340 via a data line 341 on the basis of a result of arbitration notified from the arbiter 310 via a signal line 319.

An example of interchanging a plurality of continuous requests by the request interchanging section 630 will next be described in the following with reference to a drawing.

Example of Changing Request Order by Request Interchanging Section 630

Figure 16A:
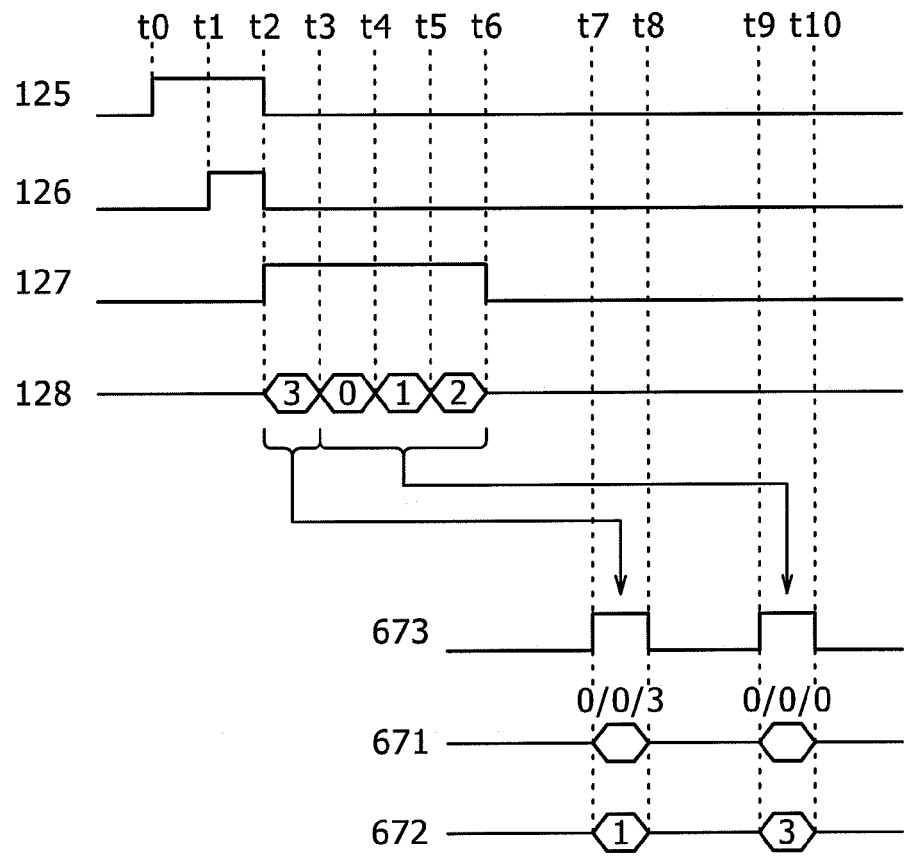
FIGS. 16A and 16B are timing charts showing examples of generating divided requests generated by interchanging continuous requests by a request interchanging section.
Figure 16B:
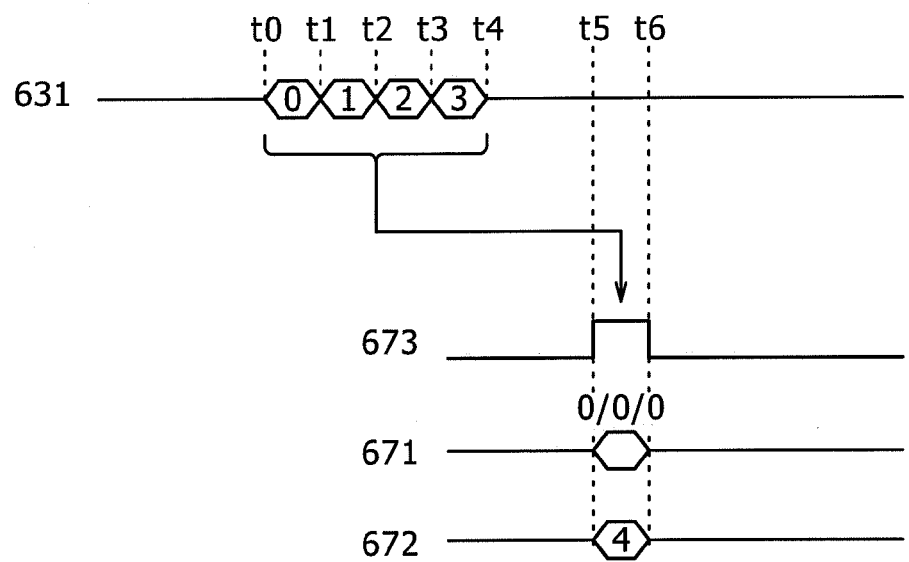

FIGS. 16A and 16B are timing charts showing examples of generating divided requests generated by interchanging continuous requests by the request interchanging section 630. FIG. 16A is a timing chart showing an example of divided requests when continuous requests are not interchanged by the request interchanging section 630. FIG. 16B is a timing chart showing an example of divided requests when continuous requests are interchanged by the request interchanging section 630.

In FIGS. 16A and 16B, a first continuous request indicating a logical address "3" corresponding to a physical address "0/0/3" and a second continuous request indicating a logical address "0" corresponding to a physical address "0/0/0" are output from the client 111. It is assumed that a third continuous request indicating a logical address "1" corresponding to a physical address "0/0/1" and a fourth continuous request indicating a logical address "2" corresponding to a physical address "0/0/2" are output next.

FIG. 16A shows output signals from a request signal line 125, an allowing signal line 126, an address enable line 127, and a logical address line 128 included in the request line 121. In addition, FIG. 16A shows a request enable line 673, a start address line 671, and a transfer length line 672 included in a divided request line 670.

At time t0, a request signal requesting the issuance of a request to the memory system 500 is output from the client 111 via the request signal line 125. At time t1, an allowing signal is output from the adapter 211 to the client 111 via the allowing signal line 126. Thereby, the request signal and the allowing signal are released. At time t2, an enable signal and the logical address "3" are output as first continuous request from the client 111 via the address enable line 127 and the logical address line 128.

Then, at time t3, the enable signal and the logical address "0" are output as second continuous request from the client 111 via the address enable line 127 and the logical address line 128. Next, at time t4, the enable signal and the logical address "1" are output as third continuous request from the client 111 via the address enable line 127 and the logical address line 128. At time t5, the enable signal and the logical address "2" are output as fourth continuous request from the client 111 via the address enable line 127 and the logical address line 128.

Next, at time t7, an enable signal, a start address "0/0/3," and a transfer length "1" are output as a first divided request from the request dividing section 640 via the request enable line 673, the start address line 671, and the transfer length line 672. Thereafter, at time t9, an enable signal, a start address "0/0/0," and a transfer length "3" are output as a second divided request from the request dividing section 640 via the request enable line 673, the start address line 671, and the transfer length line 672.

Thus, when the first to fourth four continuous requests are issued from the client 111, the first and second divided requests are output from the request dividing section 640.

FIG. 16B shows a physical address signal output from the request interchanging section 630 via a physical address line 631 for outputting a physical address. FIG. 16B shows only column addresses for convenience. In addition, FIG. 16B shows output signals of the request enable line 673, the start address line 671, and the transfer length line 672 included in the divided request line 670.

At times t0 to t4, a first physical address "0/0/0," a second physical address "0/0/1," a third physical address "0/0/2," and a fourth physical address "0/0/3" are sequentially output from the request interchanging section 630 via the physical address line 631.

Then, at time t5, an enable signal, a start address "0/0/0," and a transfer length "4" are output as a third divided request from the request dividing section 640 via the request enable line 673, the start address line 671, and the transfer length line 672.

Thus, the provision of the request interchanging section 630 makes it possible to generate the first to fourth continuous requests into one divided request. Therefore the issuance of commands to the memory system 500 can be reduced.

Thus, the second embodiment of the present invention can generate a divided request by a command unit even when a plurality of continuous requests specifying one address are issued from the clients 111 to 114. Thereby efficiency of access to the memory system 500 can be improved.

Thus, according to the embodiments of the present invention, by providing the adapters 211 to 214, arbitration with excellent data transfer efficiency in the memory system 500 can be performed in the arbiter 310. Thereby, request order control with data transfer efficiency taken into account can be performed by the arbiter 310 alone.

Incidentally, while basic functions of the adapters 211 to 214 have been described in the first and second embodiments of the present invention, additional functions can be added to the adapters 211 to 214. Accordingly, an example of configuration when additional functions are added to the adapters 211 to 214 will be briefly described below as a third embodiment with reference to drawings.

3. Third Embodiment

Example of Gate Function Being Provided to Adapter 211

Figure 17:
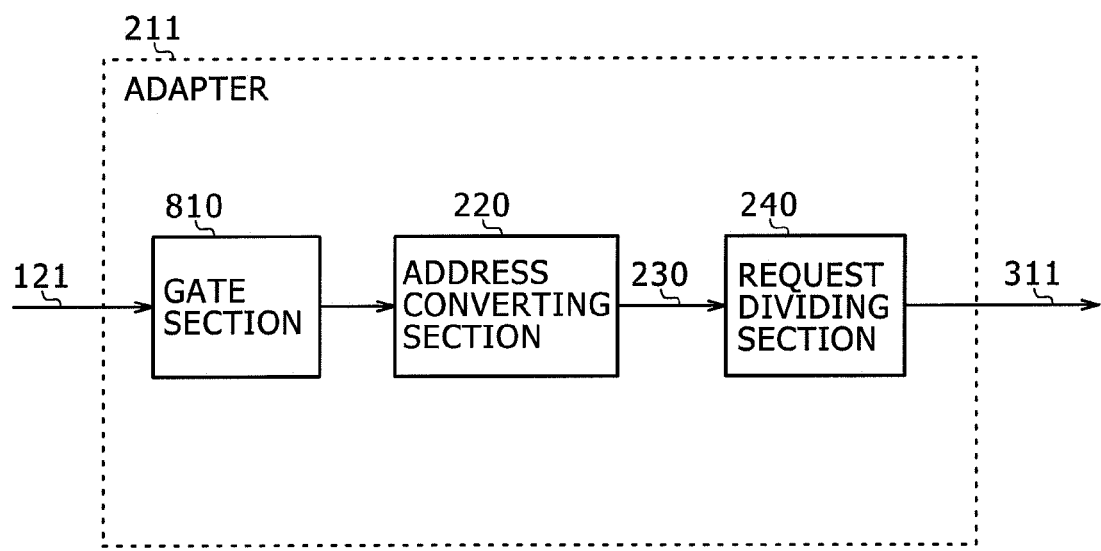
FIG. 17 is a block diagram showing an example of configuration of an adapter having a gate function according to a third embodiment of the present invention.

FIG. 17 is a block diagram showing an example of configuration of an adapter 211 having a gate function according to a third embodiment of the present invention. The adapter 211 includes a gate section 810 in addition to the configuration shown in FIG. 2. In this case, the configuration other than the gate section 810 is similar to that of FIG. 2. Thus, the same reference numerals as in FIG. 2 are applied, and detailed description of the configuration other than the gate section 810 will be omitted in the following.

The gate section 810 blocks a request issued to the adapter 211 without a permission for request issuance from a memory controlling device 200. The gate section 810 for example discards a request issued from a client 111 at the time of starting the memory controlling device 200. This is an erroneous operation preventing function for a case where the memory controlling device 200 cannot perform normal communication with the client 111 when the memory controlling device 200 receives a request from the client 111 before completing an initial operation.

Thus, by providing the gate section 810, a request issued without permission at the time of starting the memory controlling device 200 is blocked. Therefore erroneous operation at the time of communication with the client 111 can be prevented. In addition, providing the gate section 810 to the adapter 211 eliminates a need to provide a gate section on the side of the client 111.

Example of Frequency Converting Function Being Provided to Adapter 211

Figure 18:
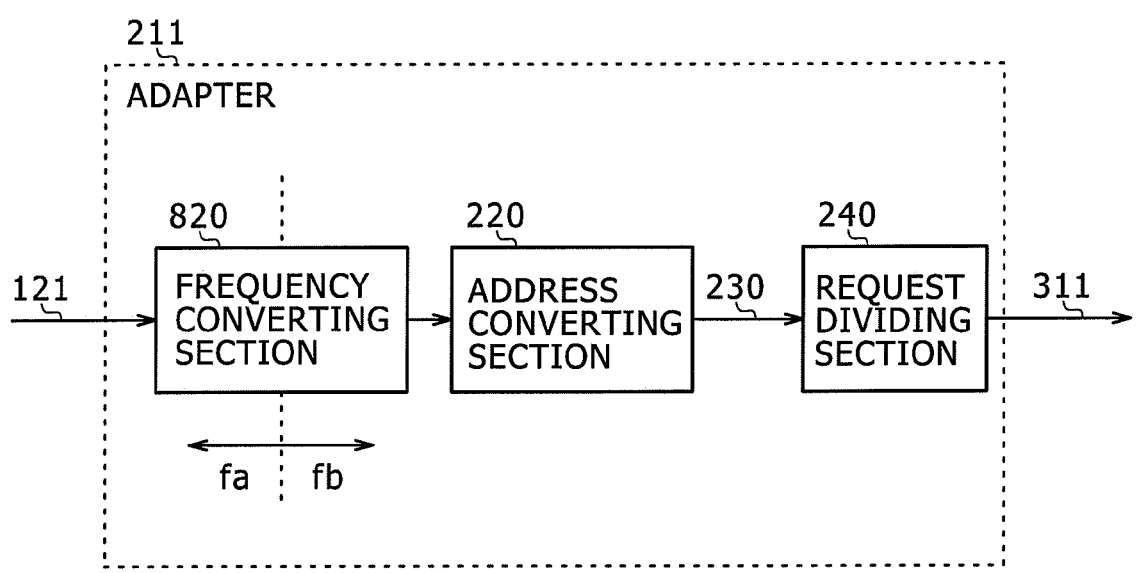
FIG. 18 is a block diagram showing an example of configuration of an adapter having a frequency converting function according to the third embodiment of the present invention.

FIG. 18 is a block diagram showing an example of configuration of an adapter 211 having a frequency converting function according to the third embodiment of the present invention. The adapter 211 includes a frequency converting section 820 in addition to the configuration shown in FIG. 2. In this case, the configuration other than the frequency converting section 820 is similar to that of FIG. 2. Thus, the same reference numerals as in FIG. 2 are applied, and detailed description of the configuration other than the frequency converting section 820 will be omitted in the following.

The frequency converting section 820 establishes a connection between the client 111 and the memory controlling device 200 that operate at clock frequencies different from each other. The frequency converting section 820 converts a signal generated in synchronism with the clock frequency (fa) in the client 111 into a signal synchronized with the clock frequency (fb) in the memory controlling device 200. In addition, the frequency converting section 820 outputs a request as the converted signal to an address converting section 220.

Thus providing the frequency converting section 820 to the adapter 211 makes it possible for the memory controlling device 200 to control access to the memory system 500 between the memory controlling device 200 and the client 111 having the different clock frequencies from each other. In addition, the provision of the frequency converting section 820 to the adapter 211 eliminates a need to adjust the clock frequency of the memory controlling device 200 to the clock frequency of the client 111. Thus limitations on design of the memory controlling device 200 are alleviated.

Example of Data Width Converting Function Being Provided to Adapter 211

Figure 19A:
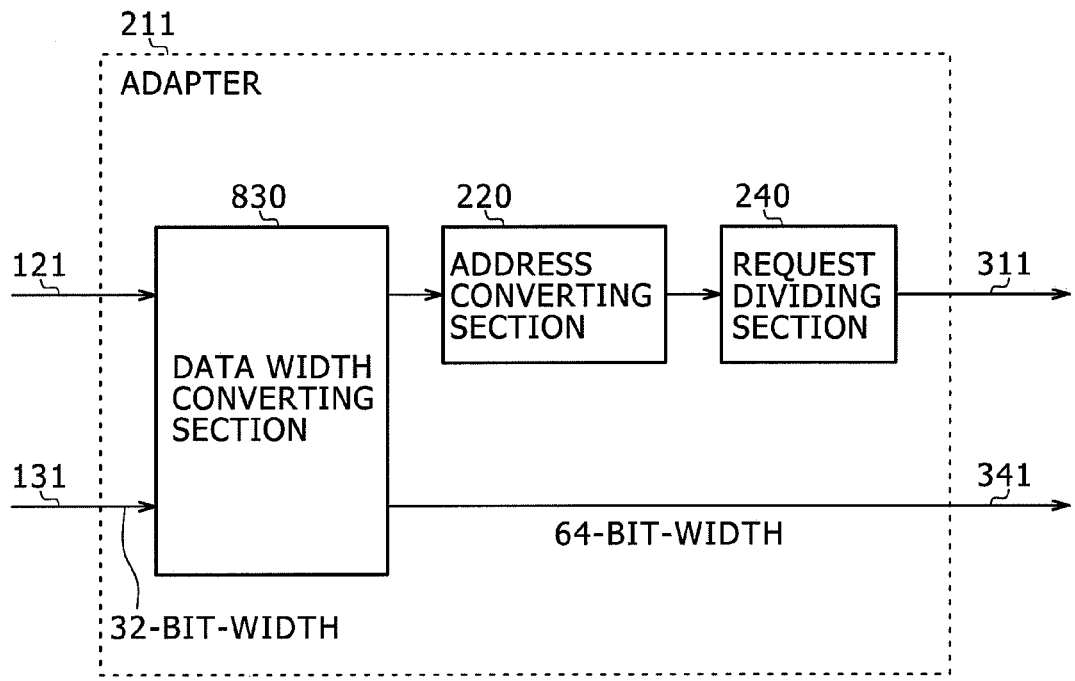
FIGS. 19A and 19B are block diagrams showing an example of configuration of an adapter having a data width converting function according to the third embodiment of the present invention.
Figure 19B:
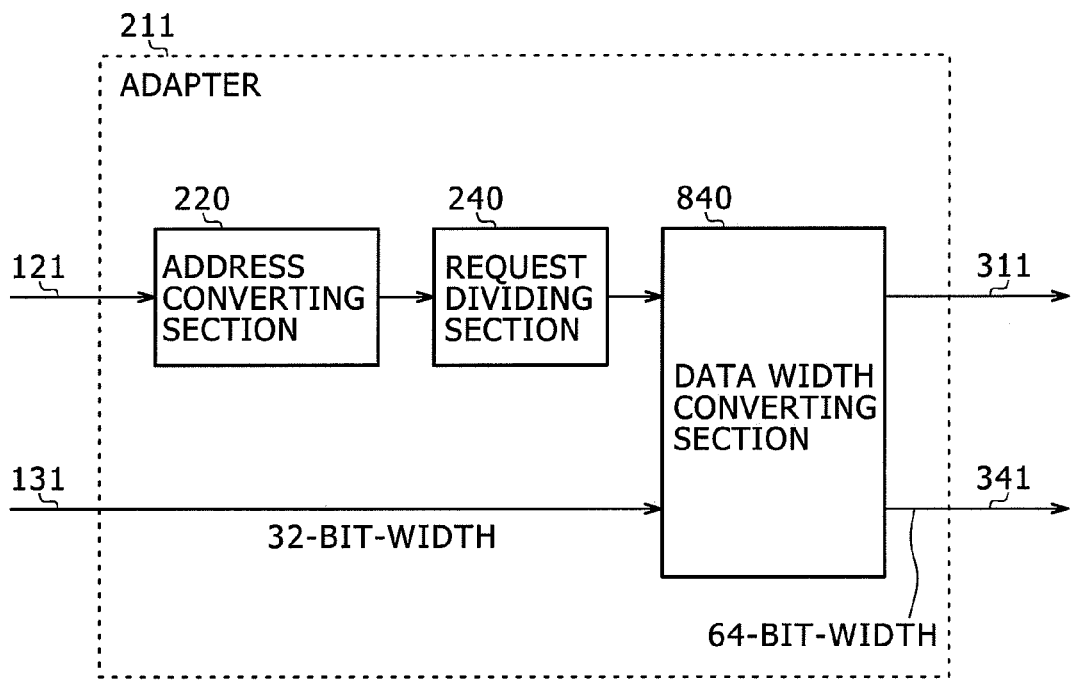

FIGS. 19A and 19B are block diagrams showing an example of configuration of an adapter 211 having a data width converting function according to the third embodiment of the present invention. The adapter 211 includes a data width converting section in addition to the configuration shown in FIG. 2. FIG. 19A is a block diagram showing an example in which a data width converting section 830 is provided in a stage preceding an address converting section 220. FIG. 19B is a block diagram showing an example in which a data width converting section 840 is provided in a stage succeeding a request dividing section 240. The configuration other than the data width converting sections 830 and 840 shown in FIGS. 19A and 19B is similar to that of FIG. 2. Thus, the same reference numerals as in FIG. 2 are applied, and detailed description of the configuration other than the data width converting sections 830 and 840 will be omitted in the following.

The data width converting section 830 shown in FIG. 19A establishes a connection between a client 111 and a memory controlling device 200 that perform transfer with different data widths from each other. The data width converting section 830 for example retains data supplied with a data width of 32 bits from the client 111. The data width converting section 830 then converts the data width by transferring the retained data with a data width of 64 bits of the memory controlling device 200 to a write selector 340 via a data line 341. In addition, the data width converting section 830 outputs a request issued from the client 111 via a data line 131 to the address converting section 220.

The data width converting section 840 shown in FIG. 19B establishes a connection between a client 111 and a memory controlling device 200 that perform transfer with different data widths from each other. The data width converting section 840 for example retains data supplied with a data width of 32 bits from the client 111. The data width converting section 840 then converts the data width by transferring the retained data with a data width of 64 bits of the memory controlling device 200 to a write selector 340 via a data line 341. In addition, the data width converting section 840 outputs a divided request from the request dividing section 240 to an arbiter 310 via a divided request line 311.

Thus providing the data width converting section 830 or 840 makes it possible for the memory controlling device 200 to perform data transfer to the memory system 500 between the memory controlling device 200 and the client 111 having the different data widths from each other. In addition, the provision of the data width converting section 830 or 840 to the adapter 211 makes it possible to design the memory controlling device 200 without considering data width in data transfer from the client 111.

Example of Coherent Function Being Provided to Adapter 211

Figure 20:
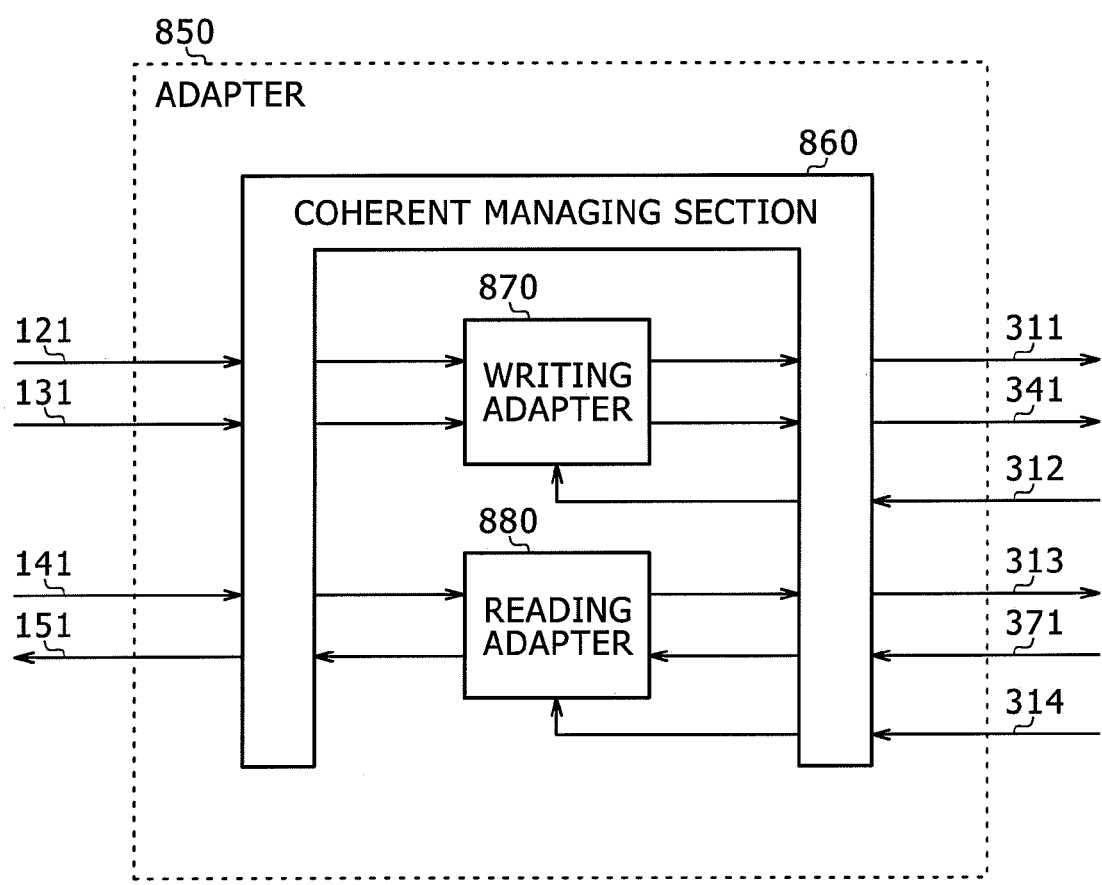
FIG. 20 is a block diagram showing an example of configuration of an adapter according to the third embodiment of the present invention.

FIG. 20 is a block diagram showing an example of configuration of an adapter 850 according to the third embodiment of the present invention. The adapter 850 corresponds to the adapter 211 shown in FIG. 2, and has a coherent managing function. It is assumed in this case that a completion signal is output from an arbiter 310 when a writing or reading operation is completed. In this case, divided request lines 311 and 313 and completion signal lines 312 and 314 are connected to the arbiter 310, and data lines 341 and 371 are connected to a write selector 340 and a read selector 370. In addition, a reading request is supplied from a reading request line 141, and data stored in the memory system 500 is supplied from a data line 151 to a client that issued the reading request.

The adapter 850 includes a coherent managing section 860, a writing adapter 870, and a reading adapter 880. The writing adapter 870 corresponds to the adapter 211 shown in FIG. 2. The reading adapter 880 is formed by adapting the adapter 211 shown in FIG. 2 for reading. Therefore description of the writing adapter 870 and the reading adapter 880 will be omitted in the following.

The coherent managing section 860 is to maintain the order of issuance of writing requests and reading requests. The coherent managing section 860 performs coherent management of the memory system 500 on the basis of a completion signal supplied from the arbiter 310 via the completion signal lines 312 and 314.

Thus providing the coherent managing section 860 makes it possible to access the memory system 500 efficiently by divided requests while maintaining the order of issuance of writing requests and reading requests.

It is to be noted that embodiments of the present invention represent an example for embodying the present invention, and that as specified in embodiments of the present invention, items in the embodiments of the present invention have respective corresponding relations to specific inventive items in claims. Similarly, specific inventive items in claims have respective corresponding relations to items given identical names in the embodiments of the present invention. However, the present invention is not limited to the embodiments, and can be embodied by making various modifications to the embodiments without departing from the spirit of the present invention.

In addition, the process steps described in the embodiments of the present invention may be construed as a method having the series of steps, and may be construed as a program for making a computer perform the series of steps or a recording medium storing the program. Usable as the recording medium are for example a CD (Compact Disc), an MD (Mini-disc), a DVD (Digital Versatile Disk), a memory card, or a Blu-ray disc (registered trademark).

The present application contains subject matter related to that disclosed in Japanese Priority Patent Application JP 2009-111828 filed in the Japan Patent Office on May 1, 2009, the entire content of which is hereby incorporated by reference.

What is claimed is:

1. A memory controlling device comprising:
an address converting section configured to convert a logical address included in a request issued from a plurality of clients into a physical address of a memory;
a request dividing section configured to divide a converted request converted by said address converting section by a command unit for said memory on a basis of the physical address of the converted request; and
an arbitrating section configured to perform arbitration on a basis of said physical address indicated in a divided request output from said request dividing section,
wherein said request dividing section includes a transfer length outputting block configured to output as a transfer length of said divided request a smaller one of a division length and a differential transfer length obtained by subtracting a cumulative total value of said division length from a transfer length of said converted request.

2. The memory controlling device according to claim 1, wherein when a converted request converted by said address converting section specifies access to a plurality of rows in an identical bank of said memory, said request dividing section divides said converted request by a row unit of said identical bank, and
when said arbitrating section receives a plurality of divided requests from said request dividing section corresponding to said plurality of clients, said arbitrating section performs arbitration so as to output one of the divided requests other than a divided request indicating an identical bank address to a bank address of an output request output immediately before and indicating a row address different from a row address of said output request.

3. The memory controlling device according to claim 2, wherein:
said address converting section outputs said converted request indicating a start address represented by said physical address and the transfer length as length of data to be accessed in said memory to said request dividing section; and
said request dividing section further includes
a start address outputting block configured to output one of the start address of said converted request and a next start address obtained by adding the start address of said converted request to a cumulative total value of division length for dividing said converted request as a start address of said divided request,
a division length generating block configured to generate said division length from a start column address included in the start address of the divided request, the start address of the divided request being output from said start address outputting block, to a termination column address of a row indicated in the start address of said divided request.

4. The memory controlling device according to claim 1, wherein said request dividing section divides said converted request by a burst length unit of said memory on a basis of said physical address of the converted request converted by said address converting section.

5. The memory controlling device according to claim 1, wherein when a plurality of first converted requests specifying one address are sequentially output from said address converting section, said request dividing section generates a second converted request indicating a start address represented by said physical address and a transfer length as length of data to be accessed in said memory on a basis of said plurality of first converted requests, and divides the generated second converted request by a row unit in said memory.

6. The memory controlling device according to claim 5, further comprising
a continuous outputting section configured to retain divided requests sequentially output from said request dividing section, and on a basis of a plurality of the retained divided requests, continuously output the plurality of divided requests.

7. The memory controlling device according to claim 6, wherein said continuous outputting section outputs said plurality of divided requests continuously on a basis of a predetermined threshold value related to a number of said plurality of divided requests.

8. The memory controlling device according to claim 6, wherein said continuous outputting section continuously outputs said plurality of divided requests on a basis of a predetermined threshold value related to a cumulative total of said transfer lengths indicated in said plurality of divided requests.

9. A memory controlling method comprising the steps of:
converting a logical address included in a request issued from a plurality of clients into a physical address of a memory;
dividing said converted request converted by said address converting step by a command unit for said memory on a basis of the physical address of the converted request; and
performing arbitration on a basis of said physical address indicated in the divided request generated by said request dividing step,
wherein said request dividing step includes a transfer length outputting step for outputting as a transfer length of said divided request a smaller one of a division length and a differential transfer length obtained by subtracting a cumulative total value of said division length from a transfer length of said converted request.

10. A memory controlling device comprising:
address converting means for converting a logical address included in a request issued from a plurality of clients into a physical address of a memory;
request dividing means for dividing a converted request converted by said address converting means by a command unit for said memory on a basis of the physical address of the converted request; and
arbitrating means for performing arbitration on a basis of said physical address indicated in a divided request output from said request dividing means,
wherein said request dividing means includes a transfer length outputting block configured to output as a transfer length of said divided request a smaller one of a division length and a differential transfer length obtained by subtracting a cumulative total value of said division length from a transfer length of said converted request.

* * * * *